(12) United States Patent
Wang et al.

(10) Patent No.: US 7,197,544 B2
(45) Date of Patent: Mar. 27, 2007

(54) VOICE AND VIDEO GREETING SYSTEM FOR PERSONAL ADVERTISEMENT AND METHOD

(75) Inventors: Wei Wang, Atherton, CA (US); Stanislav Zvinyatskovsky, Mountain View, CA (US); Hui Zhang, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 216 days.

(21) Appl. No.: 10/754,872

(22) Filed: Jan. 9, 2004

(65) Prior Publication Data

US 2004/0143841 A1 Jul. 22, 2004

Related U.S. Application Data

(60) Provisional application No. 60/438,768, filed on Jan. 9, 2003.

(51) Int. Cl.
*G06F 13/00* (2006.01)
(52) U.S. Cl. .................. 709/219; 709/225; 719/329
(58) Field of Classification Search ............... 709/206, 709/217, 219; 719/328, 329
See application file for complete search history.

(56) References Cited

U.S. PATENT DOCUMENTS

| 5,818,836 | A | 10/1998 | DuVal ................... 370/389 |
|---|---|---|---|
| 5,857,193 | A | 1/1999 | Sutcliffe et al. .............. 707/10 |
| 5,995,976 | A * | 11/1999 | Walker et al. ........... 707/104.1 |
| 5,996,006 | A | 11/1999 | Speicher ................... 709/218 |
| 6,052,122 | A | 4/2000 | Sutcliffe et al. ............ 345/331 |
| 6,058,417 | A * | 5/2000 | Hess et al. ................. 709/219 |
| 6,064,967 | A | 5/2000 | Speicher .................... 705/1 |
| 6,073,105 | A | 6/2000 | Sutcliffe et al. ............... 705/1 |
| 6,243,375 | B1 * | 6/2001 | Speicher .................... 370/352 |
| 6,249,282 | B1 | 6/2001 | Sutcliffe et al. ............ 345/331 |
| 6,267,379 | B1 | 7/2001 | Forrest et al. .............. 273/431 |
| 6,282,515 | B1 | 8/2001 | Speicher |
| 6,285,984 | B1 | 9/2001 | Speicher .................... 705/14 |
| 6,421,433 | B1 | 7/2002 | Arsenault |
| 6,434,222 | B1 * | 8/2002 | Shaffer et al. ........... 379/88.13 |
| 6,489,935 | B1 | 12/2002 | Amundsen ................... 345/2 |
| 6,502,077 | B1 | 12/2002 | Speicher .................... 705/14 |
| 6,628,644 | B1 * | 9/2003 | Nelson et al. .............. 370/352 |
| 6,697,786 | B2 | 2/2004 | Speicher .................... 705/14 |
| 6,735,568 | B1 | 5/2004 | Buckwalter et al. ........... 705/1 |
| 6,836,762 | B2 | 12/2004 | Speicher |
| 6,898,571 | B1 * | 5/2005 | Val et al. ................... 705/14 |
| 6,912,398 | B1 * | 6/2005 | Domnitz .................... 455/461 |
| 7,047,041 | B2 * | 5/2006 | Vänskä et al. .............. 455/558 |
| 2002/0049616 | A1 | 4/2002 | Speicher |
| 2002/0056123 | A1 * | 5/2002 | Liwerant et al. .............. 725/87 |
| 2003/0135412 | A1 | 7/2003 | Speicher |
| 2004/0260792 | A1 | 12/2004 | Speicher |
| 2005/0083906 | A1 | 4/2005 | Speicher |

* cited by examiner

Primary Examiner—Viet D. Vu
(74) Attorney, Agent, or Firm—Darby & Darby PC; Thomas R. Marquis

(57) ABSTRACT

A system is provided for appending a personal greeting onto a personal advertisement for presentation on a hosted website over the Internet. The system includes a client, a communication link, and a server. The client has an input device and a browser. The server has memory for storing a database of personal advertisements and at least one of a voice and a video greeting system. The greeting system cooperates with the database and the communication link to enable a user of the client to access a personal advertisement from the database, input a personal greeting to the server from client, and associate the personal greeting with the personal advertisement. A method is also provided.

21 Claims, 25 Drawing Sheets

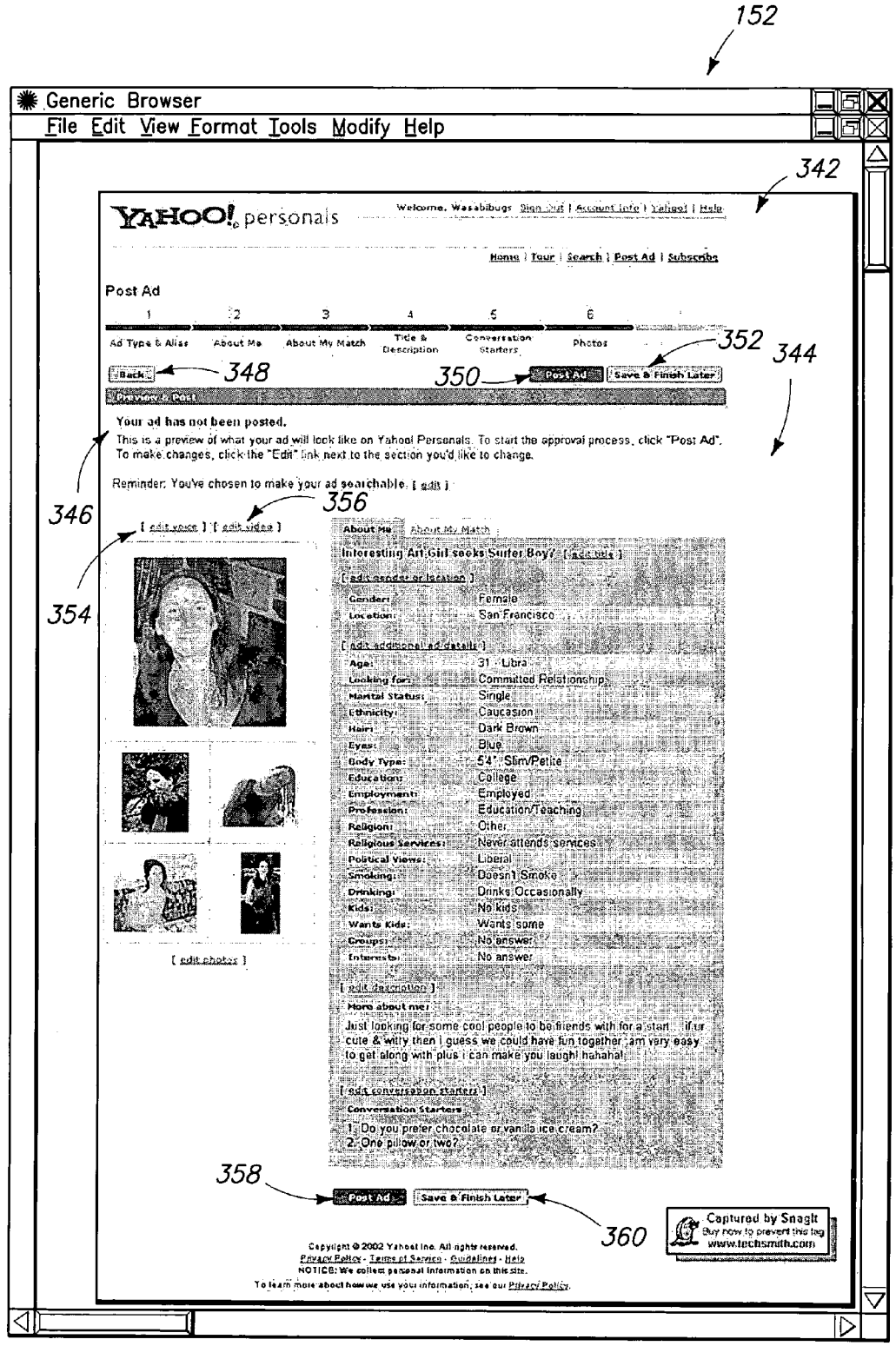

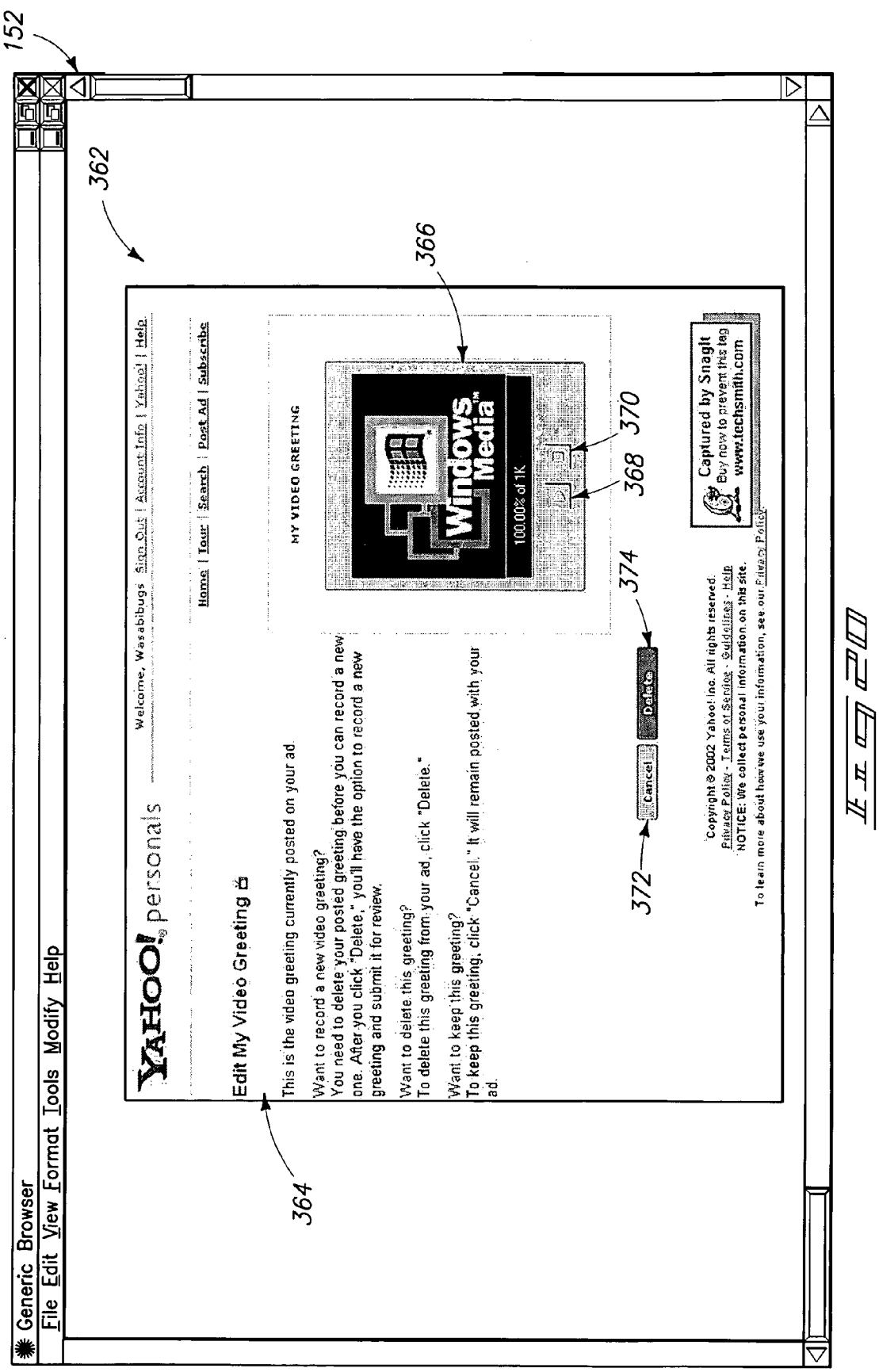

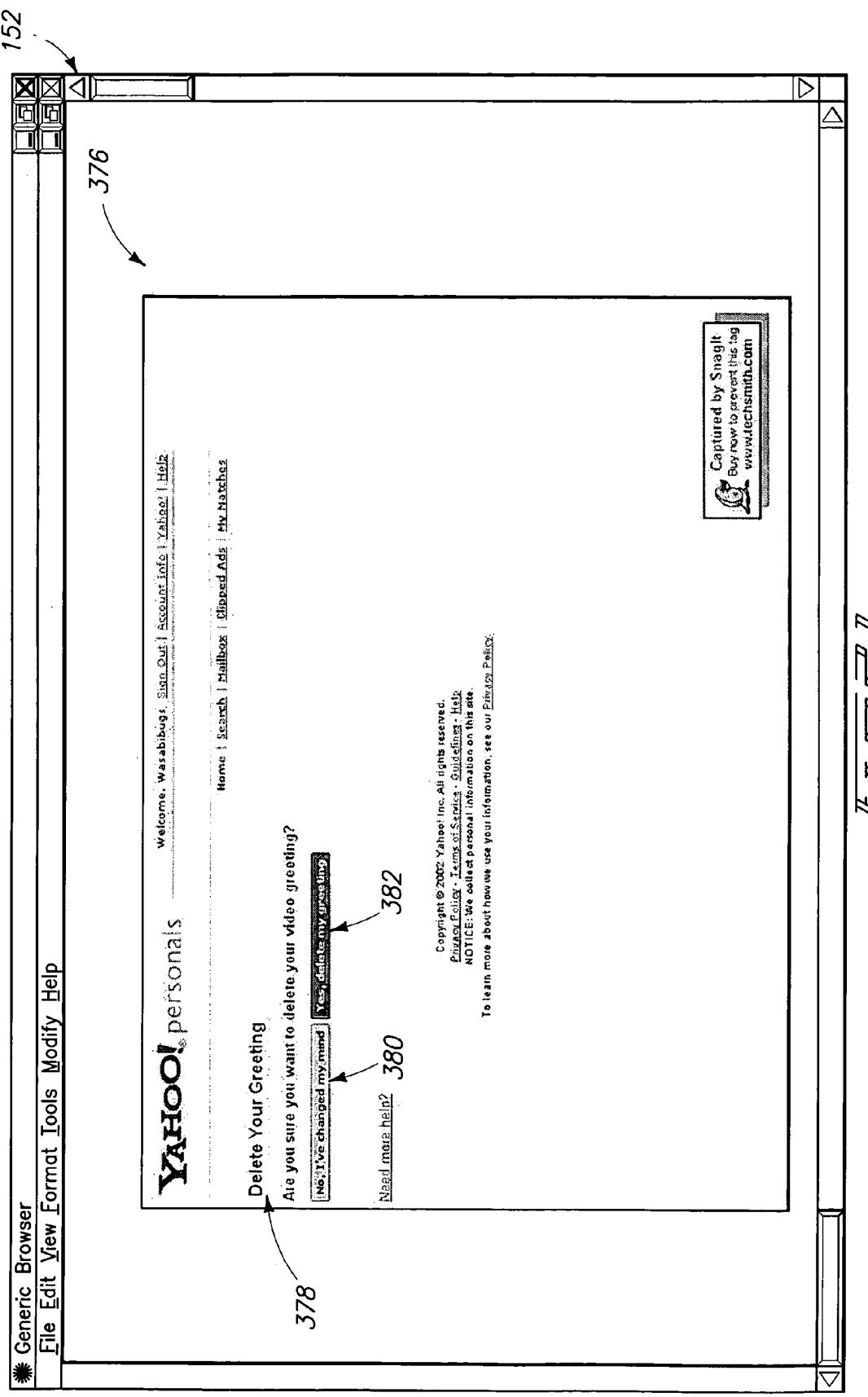

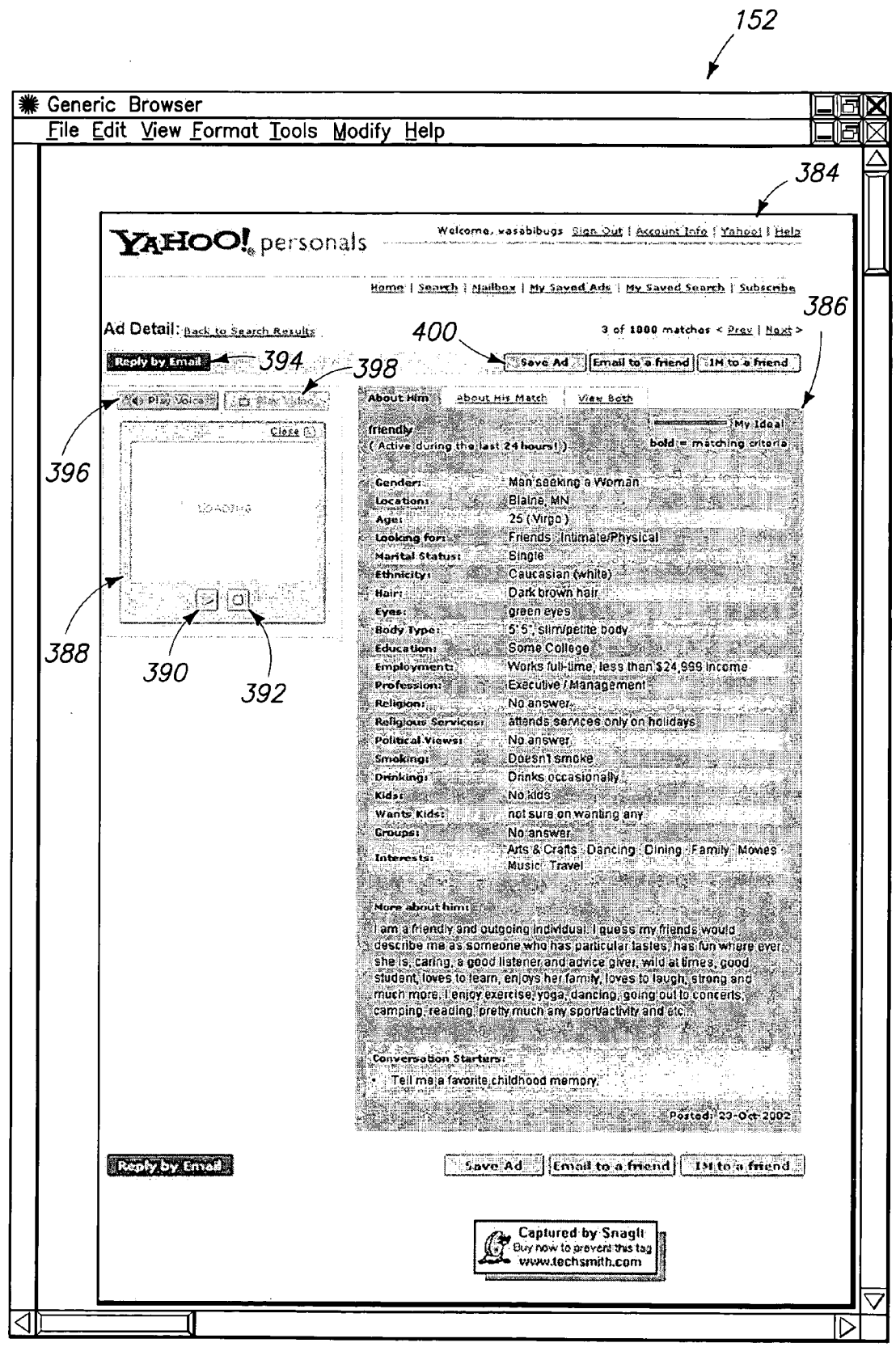

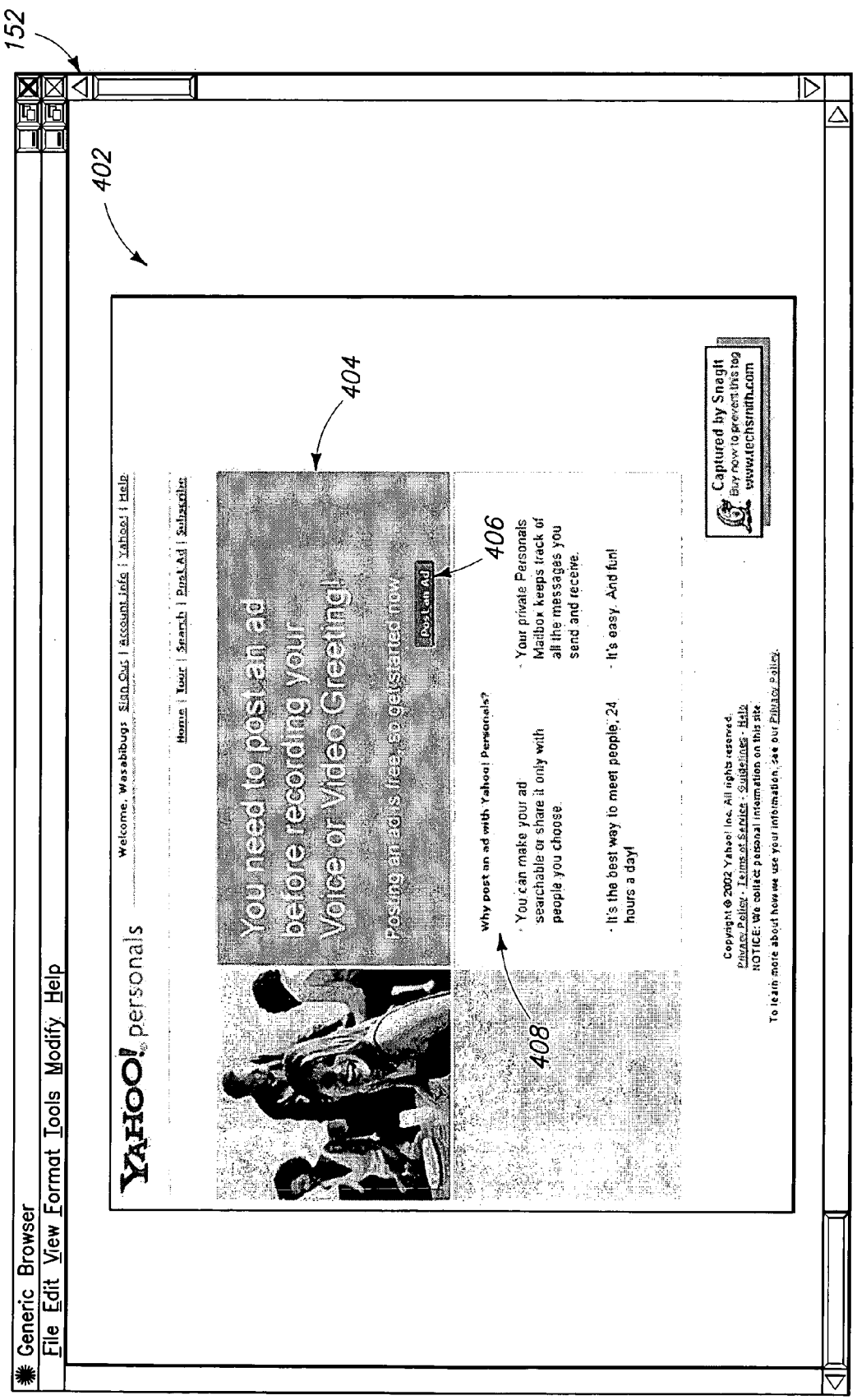

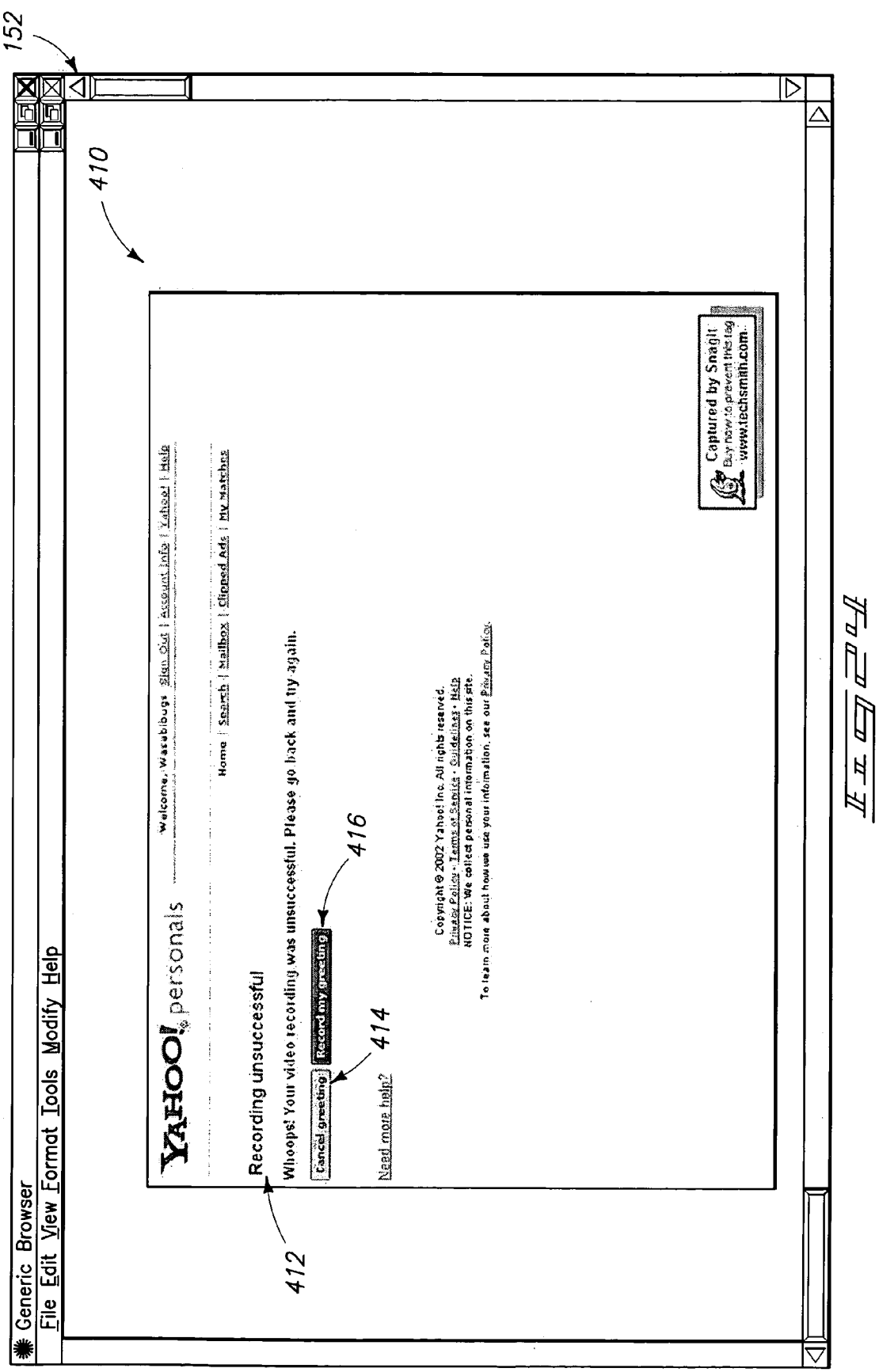

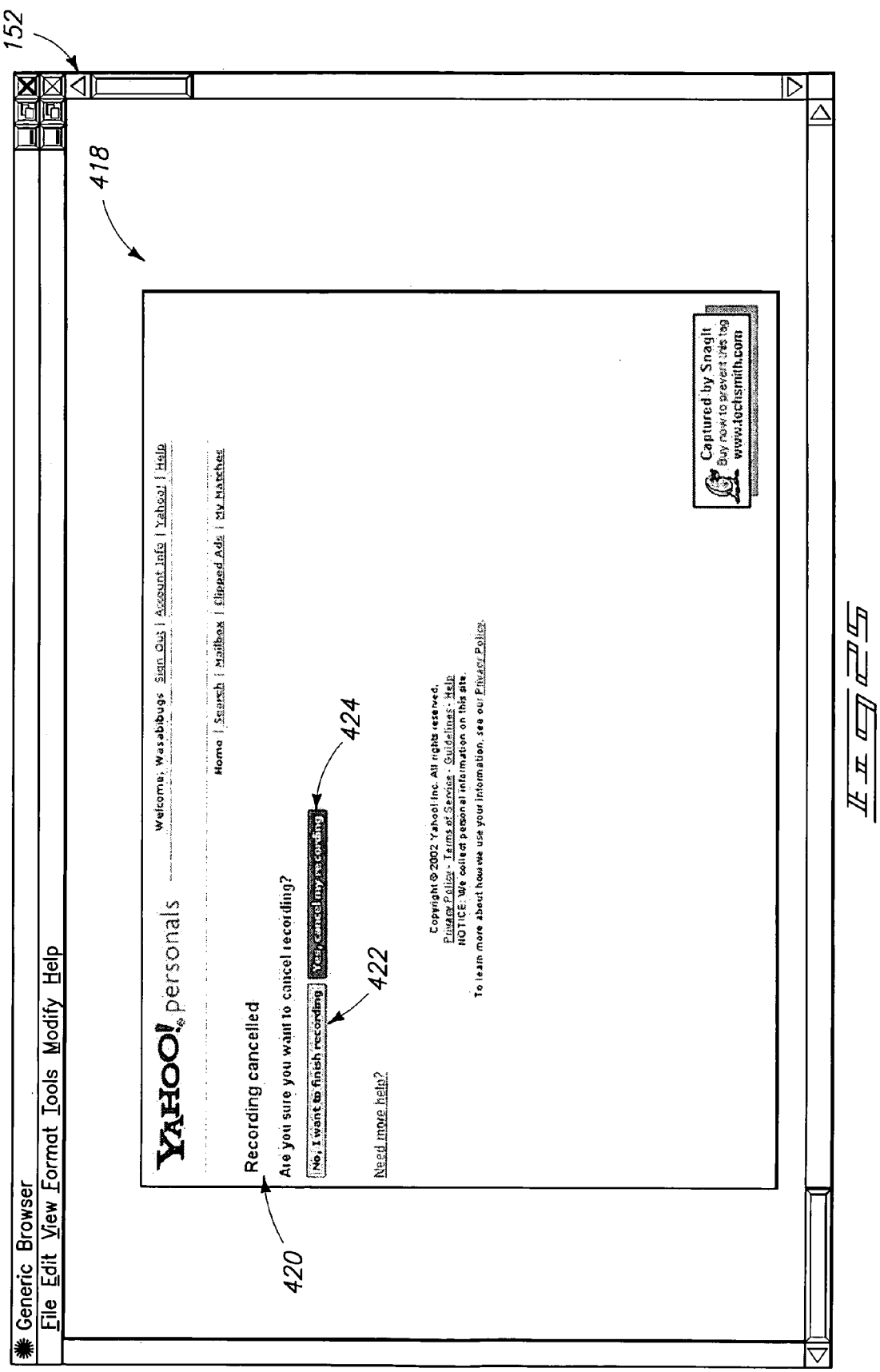

US 7,197,544 B2

VOICE AND VIDEO GREETING SYSTEM FOR PERSONAL ADVERTISEMENT AND METHOD

CROSS-REFERENCE TO RELATED APPLICATIONS

This application claims the benefits of U.S. Provisional Patent Application Ser. No. 60/438,768, entitled "Voice and Video Greeting System", which was filed on Jan. 9, 2003, naming inventors as Wei Wang, Stas Zvinyatskovsky, and Hui Zhang, and which is incorporated by reference herein.

TECHNICAL FIELD

This invention pertains to information relating to a personal advertisement that is made available over a network. More particularly, the present invention relates to methods and systems for appending voice and/or video information to online personal advertisements made available over the Internet to third-party observers or a general population.

BACKGROUND OF THE INVENTION

Matchmaking and dating services for persons have recently been adopted for implementation on the Internet. Previously, matchmaking services were performed by third-party service providers that interviewed parties seeking a match, reviewed biographies for individual parties, and identified potentially compatible parties that form a suitable match, based upon the judgment of the third-party service provider. More particularly, several service providers have recently implemented online personal advertisements that enable individual parties to directly identify potential matches without using the judgment of a third-party service provider. For example, Applicant recently implemented "Yahoo! Personals" which enables persons to review and analyze online personal advertisements comprising individual resumes containing personal data and photographs that are posted onto Applicant's website on the Internet. However, there exists a need to render available more detailed personal information so that individual persons can better determine a compatible match with another person.

SUMMARY OF THE INVENTION

Systems and methods are provided to enhance the presentation of personal information online via the Internet to individuals that desire to find a personal match when considering social accomplices, dates, friends, significant others, and potential spouses. More particularly, one or more of voice and video greetings are rendered available to online personal advertisements, which enable an individual to review, analyze, and identify a potential match with another individual. Furthermore, a host provides the ability and infrastructure to post the online personal advertisements, while further enabling review and acceptance (or rejection) by the host of voice and/or video information that is appended to the online personal advertisements by individuals.

According to one aspect, a method is provided for appending information to a personal advertisement available on the Internet. The method includes: providing a database communicating with the Internet and configured to store information pertaining to data records of personal advertisements; accessing a selected personal advertisement at a location remote from the database; and appending a personal greeting to the selected personal advertisement According to another aspect, a system is provided for appending a personal greeting onto a personal advertisement for presentation on a hosted website over the Internet. The system includes a client, a communication link, and a server. The client has an input device and a browser. The server has memory for storing a database of personal advertisements and at least one of a voice and a video greeting system. The greeting system cooperates with the database and the communication link to enable a user of the client to access a personal advertisement from the database, input a personal greeting to the server from the client, and associate the personal greeting with the personal advertisement.

According to yet another aspect, a method is provided for adding a recorded greeting onto a personal advertisement having textual information about a person. The method includes: providing a database of personal advertisements viewable at distributed locations about a network; identifying a personal advertisement for a specific person; and enabling the specific person to submit a recorded personal greeting for review by personnel for a service provider to approve or reject the personal greeting.

One advantage results in that the ability is enhanced for a person to identify a compatible match with another person using video and/or audio information that is appended to textual and pictorial information in a personal advertisement.

BRIEF DESCRIPTION OF THE DRAWINGS

Preferred embodiments of the invention are described below with reference to the following accompanying drawings.

FIG. 19 illustrates a screen display of an "Editing a Personal Advertisement" page that provides a personals preview page allowing editing of the voice and video features appended to a user's personal advertisement.

FIG. 20 illustrates a screen display of an "Edit Video Greeting" page with a video player for reviewing and editing the recorded video greeting.

FIG. 21 illustrates a screen display of a "Video Delete Confirmation" page that confirms with the user whether they want to delete their video greeting.

FIG. 22 illustrates a screen display of a "Play Video" personal advertisement page having a video player that enables a user or third parties to review personal information within a personal advertisement.

FIG. 23 illustrates a screen display of a "User Needs to Post an Ad" page that informs a user that a personal advertisement has not been previously posted.

FIG. 24 illustrates a screen display of a "Recording Unsuccessful" page that informs a user that a video greeting recording has been unsuccessful.

FIG. 25 illustrates a screen display of a "Recording Cancelled" page that asks a user to confirm whether they want to cancel the video recording.

DETAILED DESCRIPTION OF THE PREFERRED EMBODIMENTS

Figure 1:
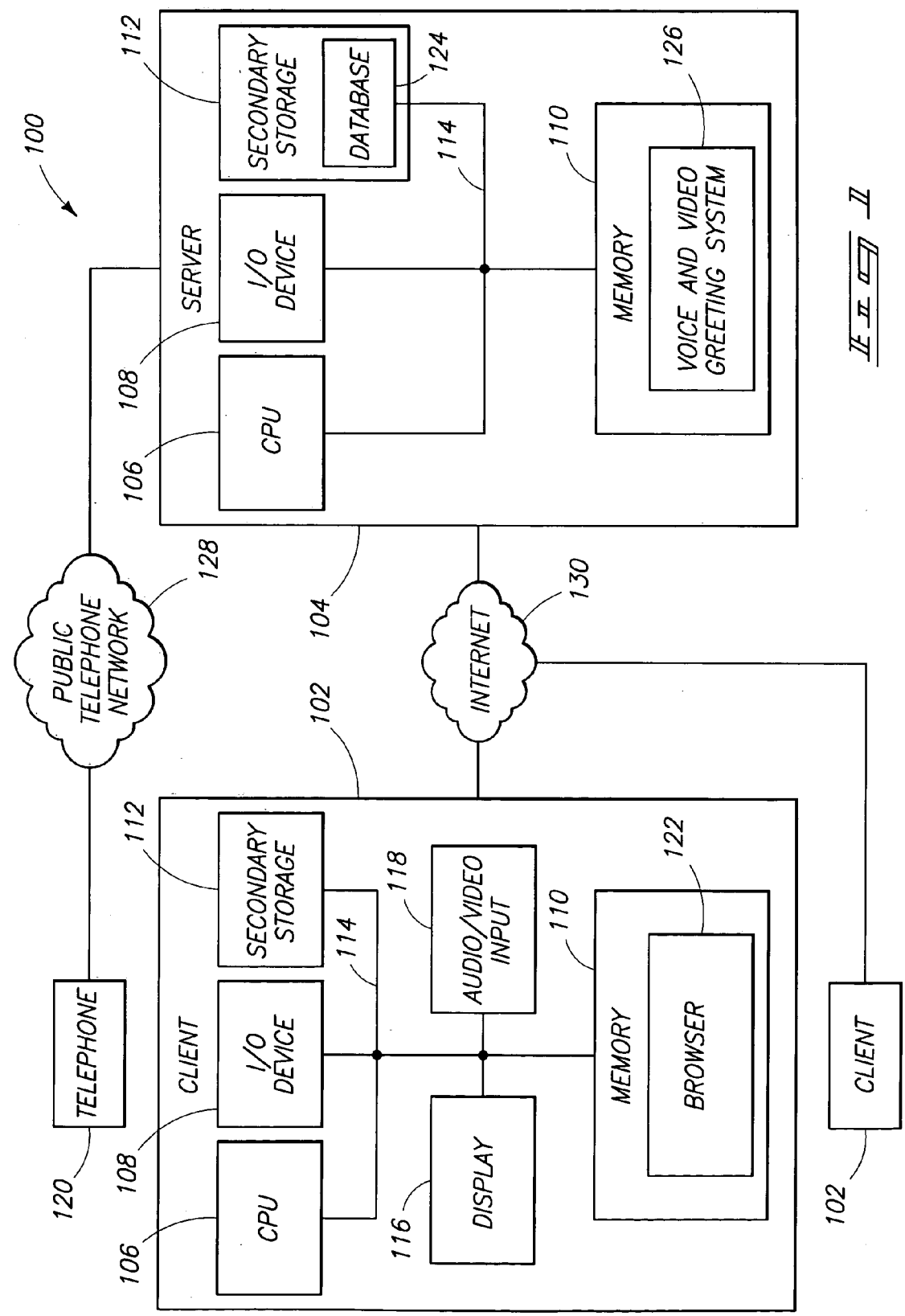
FIG. 1 is a schematic block diagram illustrating a data processing system configured to implement the system and methods of appending information to a personal advertisement available on the Internet according to one aspect of the present invention.

This disclosure of the invention is submitted in furtherance of the constitutional purposes of the U.S. patent Laws "to promote the progress of science and useful arts" (Article 1, Section 8).

Reference will now be made to a preferred embodiment of Applicant's invention. An exemplary implementation is described below and depicted with reference to the drawings comprising a system and method for appending voice and/or video content to online personal advertisements, according to various aspects of the present invention. A first embodiment is shown and described below in a first configuration with reference generally to FIGS. 1–6.

While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

As used herein, the term "personal greeting" is a personal message application comprising a multi-media element with sound and/or video, and which is dynamic in a visual or audio context, in contrast with pictures which are static in a visual context.

As used herein, the term "personal advertisement" refers to a collection of personal information that may include biographic information and that is disseminated to third parties over a network, such as the Internet. According to prior art techniques, a "personal advertisement" was limited to textual and static graphic information that is visually displayed to a third-party user on a web page of a service provider. When implemented with features of the present invention, a "personal advertisement" further comprises a multi-media presentation including multi-media elements that are textual, audio, and graphic, and may include motion video so as to provide a multi-media presentation having dynamic visual and/or audio (or voice) elements in combination with static elements.

Systems and methods in accordance with the present invention are configured to provide voice and/or video greetings for online personal advertisements. Voice and video greetings allow users to enhance static online personal advertisements, thereby conveying greater information to the viewer and creating greater interest. For example, when a viewer clicks on a personal advertisement with a video greeting, the viewer may then hear and see a video of the person who submitted the advertisement. Such recorded voice and video clips may be used in order to enhance other advertisements or personal description items besides personal advertisements.

When a user has submitted an online personal advertisement, the user may add voice or video (or both) content to the advertisement. In order to add voice content, a user logs onto a website, creates or accesses their personal advertisement, and makes a request to add a voice recording (e.g., by clicking on a link or icon). According to one implementation, when a user requests to add a voice recording, the website requests the user to input a telephone number that the personal advertisement system may call to record the voice clip from the user. According to another implementation, the user may be given a telephone number to call in order to record the voice clip. According to yet another implementation, the user may call a telephone-based system component in order to add and manage their recordings without using a computer.

In the event that a user supplies a telephone number and the personal advertisement system calls the telephone number, the user may answer and follow voice prompts from the system in order to create a voice recording over the telephone. Through the guidance of the voice prompts, the user may add, replay, edit or delete the voice recording.

When a viewer views an advertisement with the saved voice recording, the user may click on an icon, for example, that indicates that a sound clip is available and appended to a personal advertisement. A voice player embedded in the web page allows viewers to hear the voice greeting directly.

In order to add a video onto an advertisement, a user logs onto a website, creates or accesses the personal advertisement and requests to add (or append) a video recording to the personal advertisement, e.g., by clicking on a link or icon. According to one implementation, the website activates a user's webcam while displaying control buttons, e.g., for recording, replaying, editing and deleting. The user uses the webcam and control buttons in order to record and create a video clip. When the video clip is recorded, it is uploaded to the website, and stored in association with the personal advertisement, by appending, combining, associating, or affiliating it with the personal advertisement. According to another implementation, the user uploads the recorded video file to the website.

When a viewer views the advertisement, the user may click on an icon, for example, that indicates that a video clip is available. A video player embedded in the personal web page (representing the personal advertisement) allows viewers to hear and view the video greeting directly.

FIG. 1 illustrates a data processing system suitable for use in accordance with systems and methods consistent with the present invention and identified by reference numeral 100. Data processing system 100 includes two client computers 102 and a server computer 104 that is connected to the Internet 130. Computers 102 and 104 may each be represented by any kind of data processing device, such as a general-purpose data processing device, a personal computer, a plurality of interconnected data processing devices, a mobile computing device, a personal data organizer, a mobile communication device including mobile telephones or similar devices. Clients 102 and server 104 may represent computers presented in a distributed computing environment, such as on the Internet. Furthermore, it is understood that additional clients and servers can be provided in the system, over those shown by clients 102 and servers 104 of FIG. 1.

Client 102 includes a central processing unit (CPU) 106, an input-output (I/O) unit 108 such as a mouse or keyboard, and a memory 110 such as a random access memory (RAM) or other dynamic storage device for storing information and instructions to be executed by the CPU. Client 102 also includes a secondary storage device such as a magnetic disk or optical disk that may communicate with each other via a bus 114 or other communication mechanism. Client 102 may also include a display 116 such as a cathode ray tube (CRT) or liquid crystal display (LCD) monitor, and an audio/video input 118 such as a webcam (or digital web camera) and/or a microphone.

System 100 of FIG. 1 also includes a telephone 120 which may belong to a user of a client computer 102. Server 104 may call the telephone 120 over a public telephone network 128 to record a voice greeting, or the telephone may call the server. Additionally, server 104 may contact another system (not shown) that makes the call to the telephone 120. There may be many more telephones 120 than shown in FIG. 1.

Although aspects of the system and method consistent with the present invention are described as being stored in memory 110, it is understood that one having skill in the art will appreciate that all or part of systems and methods consistent with the present invention may be stored on or read from other computer-readable media, such as secondary storage devices, like hard disks, floppy disks, and CD-ROMs; a carrier wave received from a network such as the Internet; or other forms of ROM or RAM either currently known or later developed. Furthermore, although specific components of the data processing system are described, one skilled in the art will appreciate that a data processing system suitable for use with methods, systems, and articles of manufacture consistent with the present invention may contain additional or different components. Client 102 may include a human user or may include a user agent. The term "user" may refer to a human user, software, hardware or any other entity using the system.

As shown in FIG. 1, memory 110 in client 102 includes a website browser 122 which is an application 122 that is typically any program or group of application programs allowing convenient browsing through information or data available in distributed environments, such as the Internet or any other network including local area networks. A browser application 122 generally allows viewing, downloading of data, and transmission of data between data processing devices. Browser 122 may also be other kinds of applications. One suitable browser is Internet Explorer™ from Microsoft Corporation of Redmond, Wash.

Although only one browser 122 is shown in FIG. 1, any number of browsers may be used in system 100. Additionally, although shown on client 102 in memory 110, these components may reside elsewhere, such as in the secondary storage 112, or on another computer, such as another client 102. Furthermore, these components may be hardware or software, whereas embodiments in accordance with the present invention are not limited to any specific combination of hardware and/or software.

FIG. 1 also depicts a server 104 that includes CPU 106, an input/output (I/O) unit 108, a memory 110, and a secondary storage device 112 having a database 124 that communicate with each other via a bus 114. The memory may store a voice and video greeting system 126 which manages the functions of the server and interacts with the database 124. The database may store information pertaining to data records of personal advertisements, associated video files, audio files, etc. The database may also reside elsewhere, such as in memory 110. Server 104 may also have many of the components mentioned in conjunction with client 102. There may be many servers 104 working in conjunction with one another. The voice and video greeting system 126 may be implemented in any way, in software or hardware or a combination thereof, and may be distributed among many computers. It may be represented by any number of components, processes, threads, etc.

Client 102 and server 104 may communicate directly or over networks, and may communicate via wired and/or wireless connections or any other method of communication. Communication may be done through any communication protocol, including known and yet to be developed communication protocols. The network may comprise many more clients 102 and servers 104 than those shown on FIG. 1, and the client and server may also have additional or different components than those shown.

In order to post a voice recording, a user may use the browser 122 on a client 102 to access the Internet and log into the server 104 to create or access a personal advertisement. Server 104 and the voice and video greeting system 126 then send a request for the number of the telephone 120 belonging to the user. The user may submit the number for the telephone 120 belonging to the user. The user may submit the telephone number to the server 104, which in turn calls the telephone 120. The user may answer the telephone 120 and follow the voice prompts provided by the server 104 to record a voice greeting. After the user finishes recording the voice greeting, the resulting voice data file may be associated with the personal advertisement and stored in the database on the server 104. The voice recording may be sent to the server 104 in other ways such as calling the server or uploading a prerecorded voice file recorded with the microphone to the server. In one implementation, the user may call a telephone-based system component to add and manage their recordings without a computer.

In order to listen to the voice recording, for example, another user may use the browser 122 on another client 102 to access the personal advertisement associated with the voice greeting. In doing so, the user may access the voice greeting on the server 104. The voice and video greeting system 126 on the server 104 may then access the database in order to retrieve the voice data file representing the voice greeting and may send the voice greeting to the client 102 over the Internet. If the client 102 does not have a suitable application, player or plug-in to play the voice file, the server 104 may send an embedded application, player or plug-in to play the file. In another implementation, a user does not need a computer in order to listen to voice recordings, and may do so by calling a telephone-based system component (not shown) directly with a telephone 120.

In order to post a video recording, a us r may use the browser 122 on a client 102 to access the Internet and log into the server 104 in order to create or access a personal advertisement. The voice and video greeting system 126 on the server 104 may activate the webcam on the client 102 and display controls for recording and editing a video greeting. The user may also upload a prerecorded video greeting. After the user finishes recording the video greeting, the resulting voice data file may be associated with the personal advertisement and stored on the database 124 on the server 104. In one implementation, for either voice or video recordings, the recording may not be posted to general viewers immediately. It may be delayed and sent to internal reviewers working in conjunction with the voice and video greeting system 126 in order to review the content for appropriateness before being posted for viewing by general viewers.

In order to watch the video recordings, for example, another user may use the browser 122 on another client 102 to access the personal advertisement associated with the video greeting. In doing so, the user may access the video greeting on the server 104. The voice and video greeting system 126 on the server 104 may access the database 124 in order to retrieve the video data file representing the video greeting and may send the video greeting to the client 102 over the Internet. If the client 102 does not have a suitable application, player or plug-in to play the video file, the server 104 may send an embedded application, player or plug-in to play the file.

Voice Greeting Configuration and Implementation

FIGS. 2–11 illustrate one implementation for appending information to a personal advertisement on an Internet site. One suitable personals advertising website comprises "Yahoo! Personals", from Yahoo! Inc., of Sunnyvale, Calif. Such a video greeting implementation enables a user to record a voice greeting of a predetermined length, e.g., a 30-second greeting, which is then attached to the user's personal advertisement. In order to realize such an implementation, a voice player is embedded on a web page for the user's personal advertisement that enables people to hear the voice greeting directly embedded within the advertisement.

According to one construction, a user is first required to submit a personal advertisement to the service provider's website (e.g., Yahoo! Inc.'s website) before being enabled the capability of recording a voice greeting. According to another implementation, a user can record a voice greeting without being a subscriber to the service provider's website.

Figure 2:
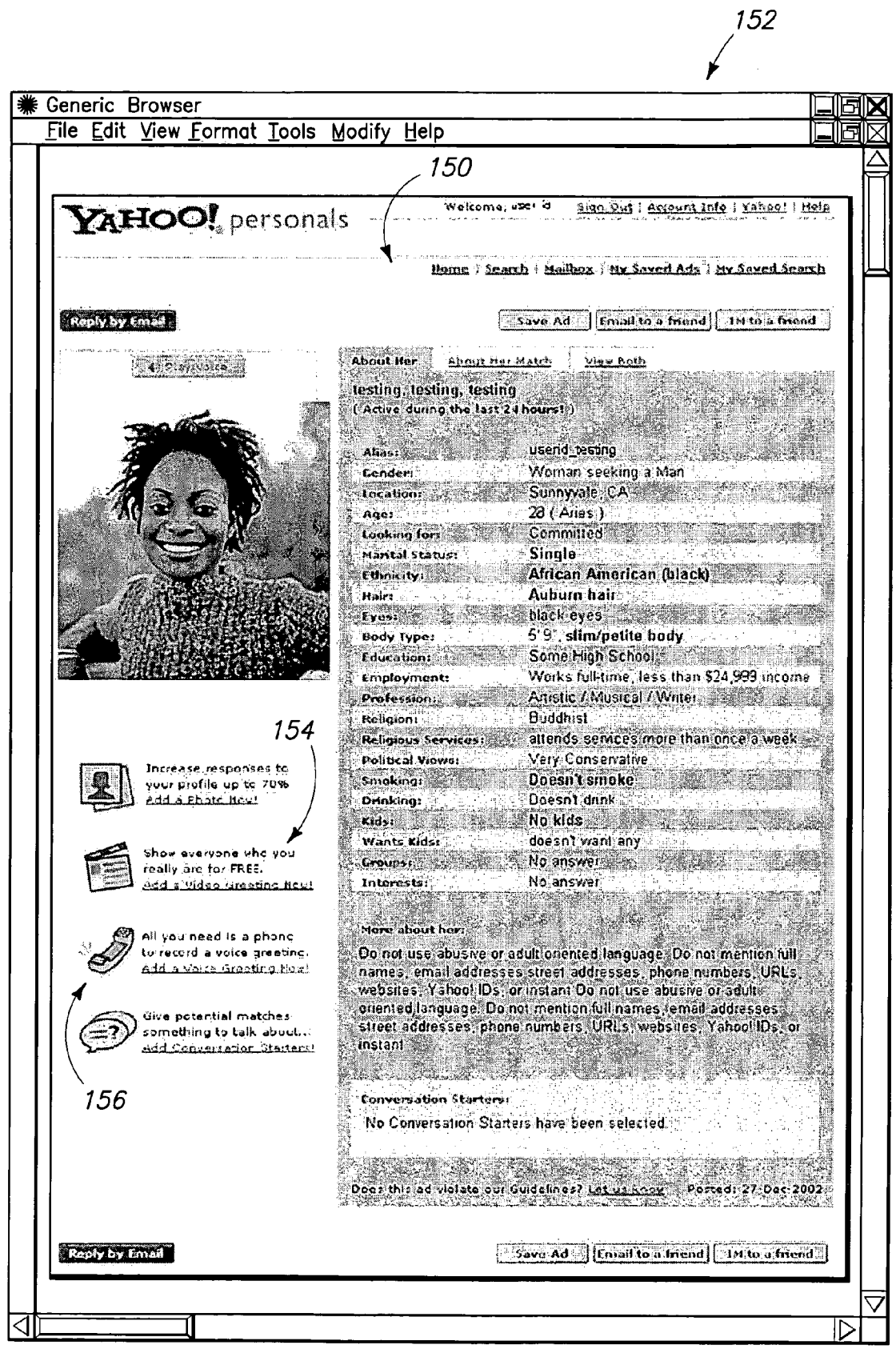
FIG. 2 is a screen display of a personal advertisement page as displayed within a generic browser at a client.

FIG. 2 illustrates a personal advertisement page 150 as displayed within a generic browser 152 at a client, or Internet-enabled computer, that is connected with a personals service provider, such as Yahoo! Personals. More particularly, a personals profile page 150 displays personal information by category about a user who has submitted a personal advertisement to the personals service provider. The personals profile page 150 is retrieved from the personals service provider's website. In past, one or more photographs were rendered available on such a personals profile page 150 for viewing by potential matching parties who are reviewing content of page 150. However, the novel aspects presented herein entail the additional provision of video and voice greeting features that enable a reviewer of such information to better judge a potential match with a personal advertisement being reviewed by the user.

More particularly, personals profile page 150 has additional features in the form of a video greeting text link 154 and a voice greeting text link 156. Video greeting text link 154 is entitled "Add a Video Greeting Now!". Voice greeting text link 156 is entitled "Add a Voice Greeting Now!". Selection of text link 154 at a client with a tactile input device, such as a mouse, causes a user to navigate to a screen display of FIG. 3. Selection of text link 156 with a tactile input device causes a user to navigate to the screen display illustrated in FIG. 12.

For purposes of better understanding the type of voice or audio information that can be appended to a personal advertisement, an overview description is warranted. The term "voice greeting" is a component that an individual can post onto their personal advertisement in order to enhance the information being presented at their personal advertisement to third-party viewers of such advertisement. The voice greeting allows the individual who has posted the advertisement to record a voice clip of a set duration, such as a 30-second voice clip, via the Personals service provider's telephone system.

As an additional beneficial feature, voice greetings are submitted by an individual who has a personal advertisement, after which the voice greetings are approved by the Personals service provider. In one case, the posting of a personal advertisement on Yahoo! Personals' system involves a Yahoo employee reviewing the voice clip for undesirable and/or illegal content in order to make a decision as to whether to approve the voice greeting (or clip) for presentment on the service provider's website.

In order to submit and approve a voice greeting, users first post a personal advertisement to the service provider's website. The users can then append or attach a voice greeting onto their personal advertisement. However, the voice greeting will only be rendered available on the service provider's website after the user's personal advertisement has been reviewed and accepted by an administrative employee of the service provider's website. In this manner, content control can be implemented by the service provider. For example, sexual content of a suggestive nature that is undesirable for children can be filtered in this manner. Furthermore, content associated with illegal activities can be denied approval and posting onto the service provider's website.

After submitting a voice greeting for review, a user is notified with an e-mail message that is delivered to the user's Personals Mailbox. The user subsequently receives a Personals Mailbox e-mail message once the greeting has either been accepted or rejected by an administrative person within the service provider's review system. In the context of a User Management Tool (UMT), voice greetings are reviewed by administrative personnel in a separate queue.

Figure 3:
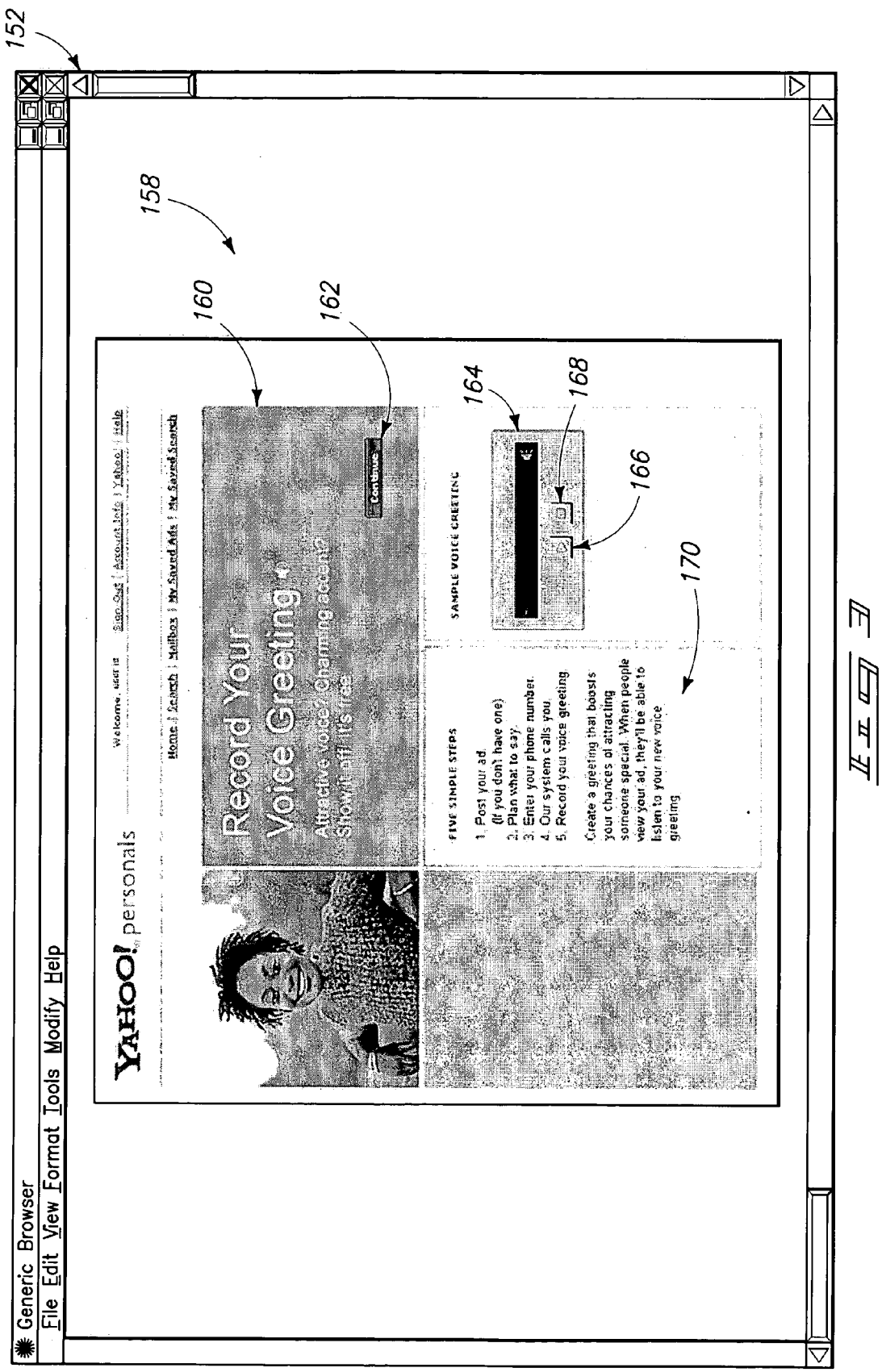
FIG. 3 is a screen display of a "Voice Greeting Splash" page.

FIGS. 3–8 illustrate the steps involved when posting a voice greeting to a user's personal advertisement. More particularly, FIG. 3 illustrates a voice greeting splash page 158 from which a user is informed about the requirements for posting a voice greeting, as well as the steps involved in recording such a voice greeting. A user navigates to page 158 in order to identify the requirements for posting a voice greeting.

Figure 4:
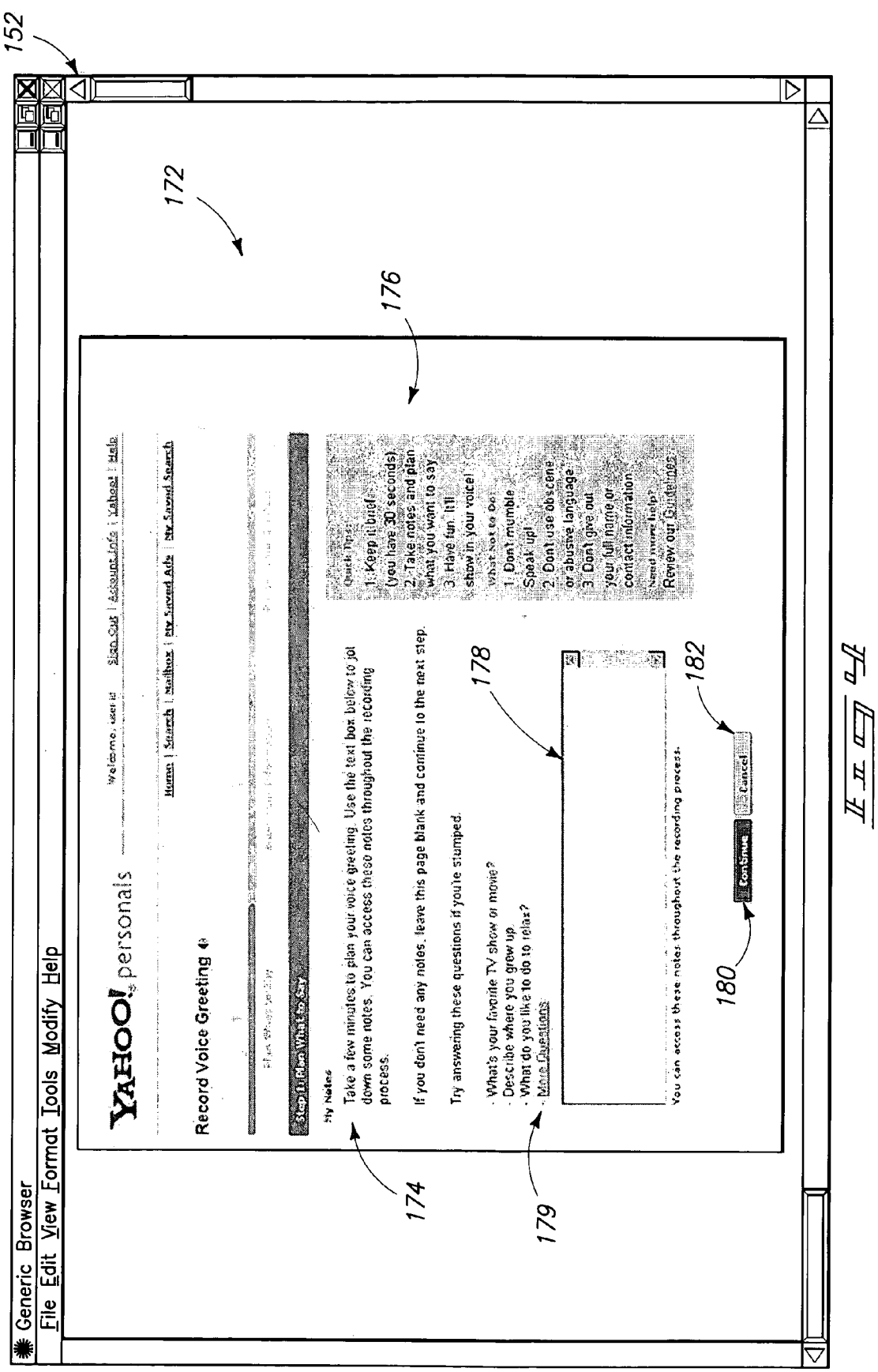
FIG. 4 is a screen display of a "Plan Your Greeting" page to assist a user in preparing and recording personal notes used during the process of recording a voice greeting.

As shown in FIG. 3, voice greeting splash page 158 is shown within a generic browser frame 152 and includes a voice greeting banner 160 in which a "continue" button 162 provides a link for navigating to the screen display of FIG. 4. A sample voice greeting is provided within an embedded audio player 164 which includes a start button 166 and a stop button 168. An instruction set 170 includes text instructions that describe the five simple steps needed to record a voice greeting.

According to one implementation, there are pre-existing requirements for a user before they are able to post a voice greeting onto a personal advertisement. At first, the user is required to have an advertisement already posted on the personals service provider's website. According to such implementation, a user is allowed to record a voice greeting if they have prepared an advertisement that is incomplete, but the voice greeting will not be posted until the advertisement is actually posted onto the website. Secondly, users are required to have a telephone, as well as a telephone number where the personals service provider can access the user in order to record the user's voice greeting.

FIG. 4 illustrates a "Plan Your Greeting" page 172 to which a user is directed after selecting "Continue" button 162 (of FIG. 3). More particularly, a text instruction set 174 details usage of an entry box 178 for preparing and recording personal notes that are used during the process of recording a voice greeting. A "Quick Tips" text instruction set 176 provides additional tips on preparing and recording a voice greeting. Text notes that are entered with an input device (such as a keyboard) into entry box 178 can be accessed throughout the recording process in order to assist a user in preparing a voice greeting. A "Continue" button 180 enables a user to navigate to the screen display of FIG. 5. A "Cancel" button 182 enables a user to cancel out of the process used to record a voice greeting.

The steps undertaken in page 172 comprise the first steps in preparing and generating a voice greeting that has been appended onto a personal advertisement that will be made available on the Internet. As the first step in the audio recording process, users are given the opportunity to type in their personal notes that describe what they want to say in their voice greeting. According to one implementation, this feature is an optional feature and can be skipped by a user who merely selects "Continue" button 180 to navigate on to the next step identified in FIG. 5. Accordingly, the user does not have to use this note feature, and it is not required that entry box 178 be filled out with text before the user goes on to the next step identified in FIG. 5.

Figure 5:
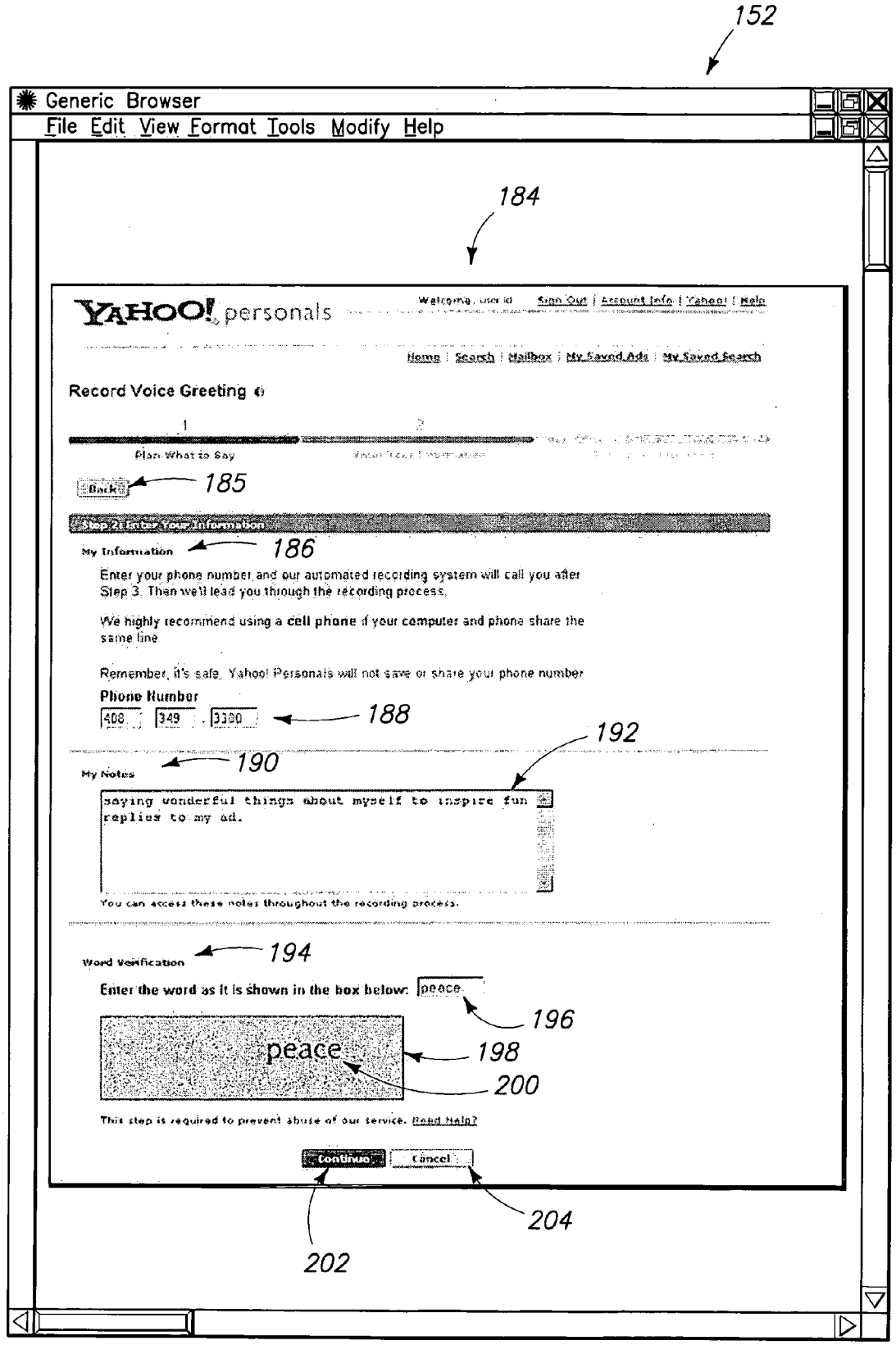
FIG. 5 is a screen display of an "Enter Your Information" page for entering a telephone number used to record a voice greeting.

In the event a user chooses to put their personal notes into the notes entry box 178, the user's notes will show up on the page identified in FIG. 5 when the user is recording their greeting. Such notes are shown within entry box 192 of FIG. 5.

In the event a user needs more inspiration while composing their voice greeting, the user can click on a "More Questions" text link 179 which gives the user a pop-up window (not shown) that contains more questions configured to help the user decide what to say in their voice greeting.

FIG. 5 illustrates a second step for posting a voice greeting in the form of an "Enter Your Information" page 184 that enables a user to enter a telephone number at which the personals service provider will call the user to prompt the user to record their voice greeting. As previously d scribed, if a user has entered personal notes into the notes entry box 178 (of FIG. 4), the personal notes will show up in box 192 of FIG. 5.

For the case where a user connects to the personals service provider's website using dial-up Internet Service Provider (ISP) access, it is recommended that the user provide a mobile (or cellular) telephone number for recording a voice greeting. This technique will enable the user to complete the voice process without having to disconnect the user's modem from the Internet while accessing the Internet via the user's client computer.

As shown in FIG. 5, a "Back" button 185 enables a user to navigate back to the screen display depicted in FIG. 4. In order to assist a user in entering their information, information is presented to the user in three categories; namely, a "My Information" instruction set 186, a "My Notes" instruction set 190, and a "Word Verification" instruction set 194.

Figure 6:
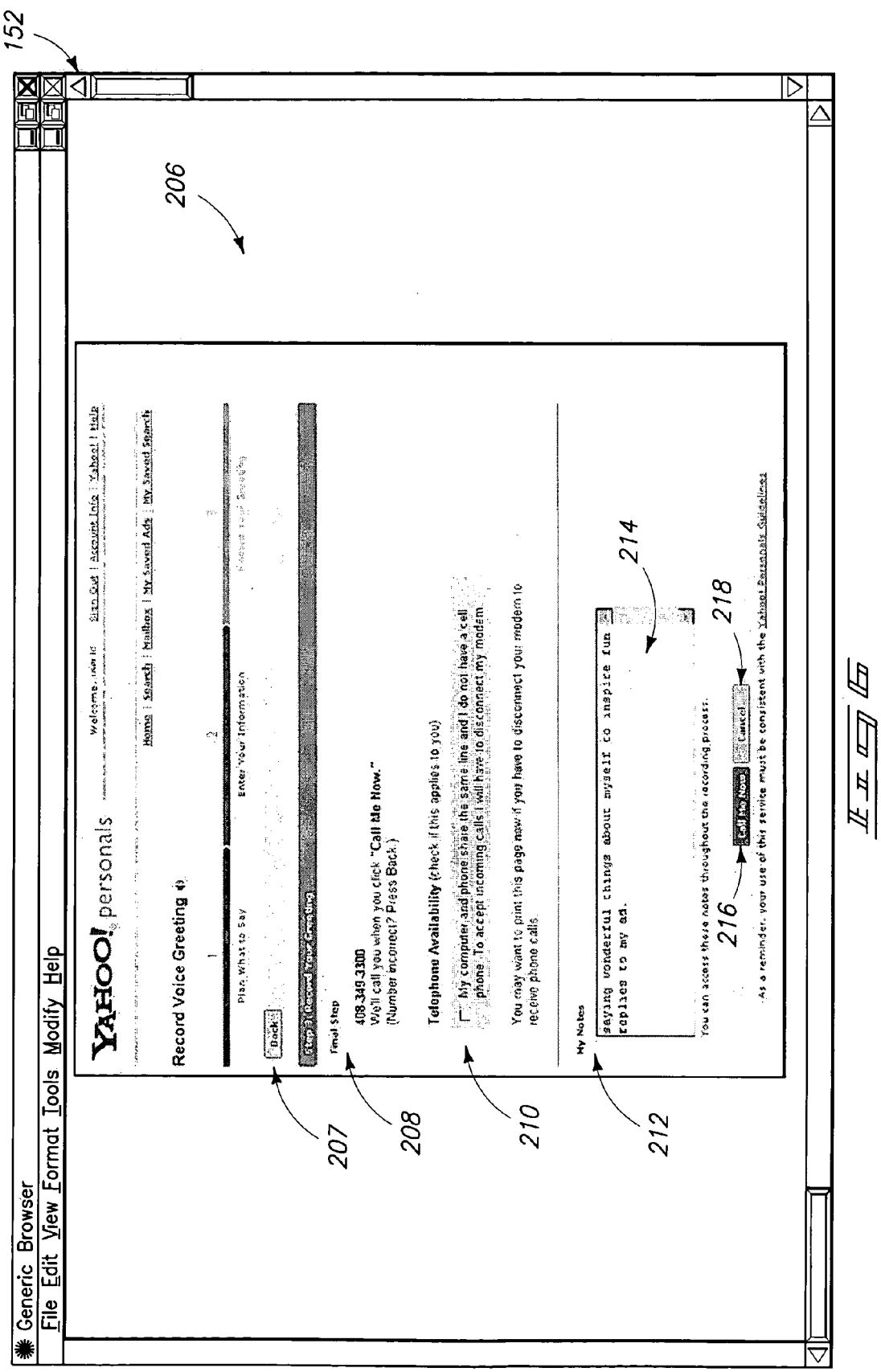
FIG. 6 is a screen display of a "Record Your Greeting" page used to confirm and input a telephone number and enable initiation of a telephone call to a user by a service provider.

"My Information" instruction set 186 provides instructions for a user to enter their telephone number so that an automated recording system from the personals service provider will call the user after completing the step identified in FIG. 6. The service provider then leads the user through the voice recording process. A telephone number entry box array 188 is provided into which a user enters their telephone number using an input device such as a keyboard or a mouse. It is understood that certain area codes and telephone numbers that presently exist can be rendered invalid, and will not be allowed by a user; e.g., 900 area code telephone numbers.

As previously discussed, the "My Notes" entry box 192 displays the previously entered personal notes that are used to assist a user in recording a voice greeting.

"Word Verification" instruction set 194 requires that a user complete a word verification check in order to continue the voice greeting process onto the functionality depicted in FIG. 6. More particularly, a "Word Verification" entry box 196 is provided into which a user must visually identify a word 200 that is presented within a word box 198. As a user visually perceives word 200, the user then enters such word into box 196 in order to confirm that the user is legitimate and in order to prevent abuse of the service provider's services. The implementation of such word verification systems is presently known and understood in the art.

A "Continue" button 202 enables a user to navigate to the screen display depicted in FIG. 6. A "Cancel" button 204 enables a user to cancel the process.

FIG. 6 illustrates a third step in posting a voice greeting on a personals service provider's website. More particularly, a "Record Your Greeting" page 206 enables a user to confirm the previously inputted telephone number, and to enable the service provider to initiate a telephone call to the user at such number. A user will be able to visually see the displayed telephone number as well as any personal notes that were previously entered in the screen display of FIG. 4. If the user identifies information that is incorrect, a "Back" button 201 is provided which will enable the user to navigate back to the screen display of FIG. 5. If the notes are incorrect, the user can further navigate back by selecting "Back" button 185 in FIG. 5 to navigate back to the screen display of FIG. 4. In this way, the user can edit the telephone number as well as the personal notes which were previously entered.

If the user approves the information displayed on page 206, the user then clicks "Call Me Now" button 216 in order to initiate the audio (or voice) recording process. This selection alerts the personals service provider's telephone system that a call needs to be placed to the number that was provided on this page 206.

As shown in FIG. 6, a "Final Step" instruction set 208 displays the previously entered telephone number and also enables a user to identify via a selection box 210 whether the user's computer (client) and telephone share the same telephone line, and the user further does not have the availability of a mobile telephone. By marking selection box 210, a user is acknowledging that the user will have to disconnect from their telephone modem to accept an incoming call from the service provider in order to record the voice greeting.

A "My Notes" instruction set 212 displays the personal notes that were previously entered to enable a user to review such notes prior to and during the voice recording process. More particularly, such personal notes are displayed in the "My Notes" entry box 214.

Figure 7:
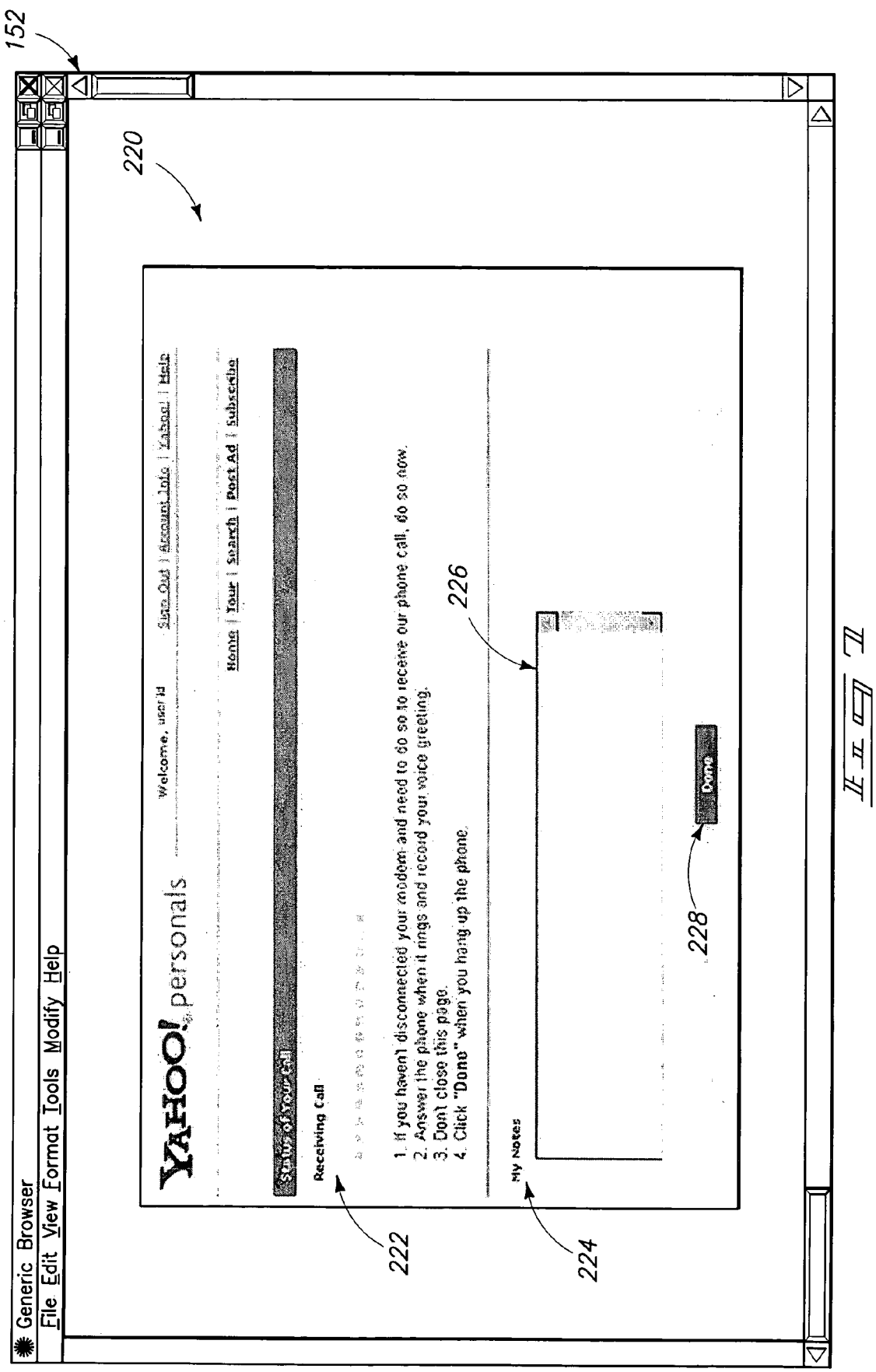
FIG. 7 is a screen display of a "Status of Your Call" page for assisting a user in posting a voice greeting to a personal advertisement by indicating call status of a telephone call.

If the user wishes to end the voice recording process here, the user can select a "Cancel" button 218 which terminates the process for posting a voice greeting to a personal advertisement on the service provider's Internet website. By selecting "Call Me Now" button 216, a user navigates to the screen display of FIG. 7. More particularly, FIG. 7 illustrates a fourth step for posting a voice greeting to a personal advertisement. A "Status of Your Call" page 220 includes a "Receiving Call" instruction set 222 and a "My Notes" instruction set 224. Page 220 lists the call status for the telephone call being implemented by the service provider to the user at the previously entered telephone number. If the user shares the telephone line with the user's computer, the telephone modem is disconnected at this point in order to receive the telephone call successfully. If the service provider tries unsuccessfully to reach the user at the entered telephone number, page 220 will recycle with a reminder to the user to disconnect the modem in order to receive the telephone call. While displaying page 220, the service provider's system switches over to the telephone system and initiates a telephone call to the user at the provided telephone number. When the user has completed identified steps on the telephone, the user comes back to the screen shown by page 220 of FIG. 7, after which the user selects "Done" button 228 after hanging up the telephone, which terminates the process.

As shown on page 220 of FIG. 7, "Receiving Call" instruction set 222 lists four steps for receiving a call from the service provider in order to record a voice greeting. Although not depicted in FIG. 7, the "My Notes" instruction set 224 includes a "My Notes" entry box 226 in which personal notes are re-displayed to the user for use during the recording of a voice greeting. When finished, the user merely selects "Done" button 228 to complete the recording process.

After clicking "Call Me Now" button 216 (of FIG. 6), as well as disconnecting a modem, if necessary, the user will receive a telephone call from the personals service provider (such as Yahoo! Inc.). Upon answering the telephone call, the user is welcomed by a recorded call service of the service provider and is asked to press numeral "1" on the telephone keypad in order to record a voice greeting. The user will then hear a beep over the telephone line and is required to then recite the user's voice greeting. According to one implementation, when the user is complete, the user must press the pound (#) sign button on the telephone keypad. The user will then hear the following options: "press 1, to save"; "press 2, to hear the voice greeting"; and "press 3, to re-record".

The user can review their voice greeting, as well as re-record the voice greeting if they do not like the voice greeting that they have reviewed. The user will be limited to a maximum of 15 attempts in order to record their voice greeting. Once a user is satisfied with their voice greeting and the user opts to save the voice greeting, the telephone system telephone call is terminated after the user is audibly re-reminded that the greeting will be placed into a review process where the service provider's administrative personnel will review the content of the voice greeting for suitability and acceptability for posting such on the service provider's website.

Figure 8:
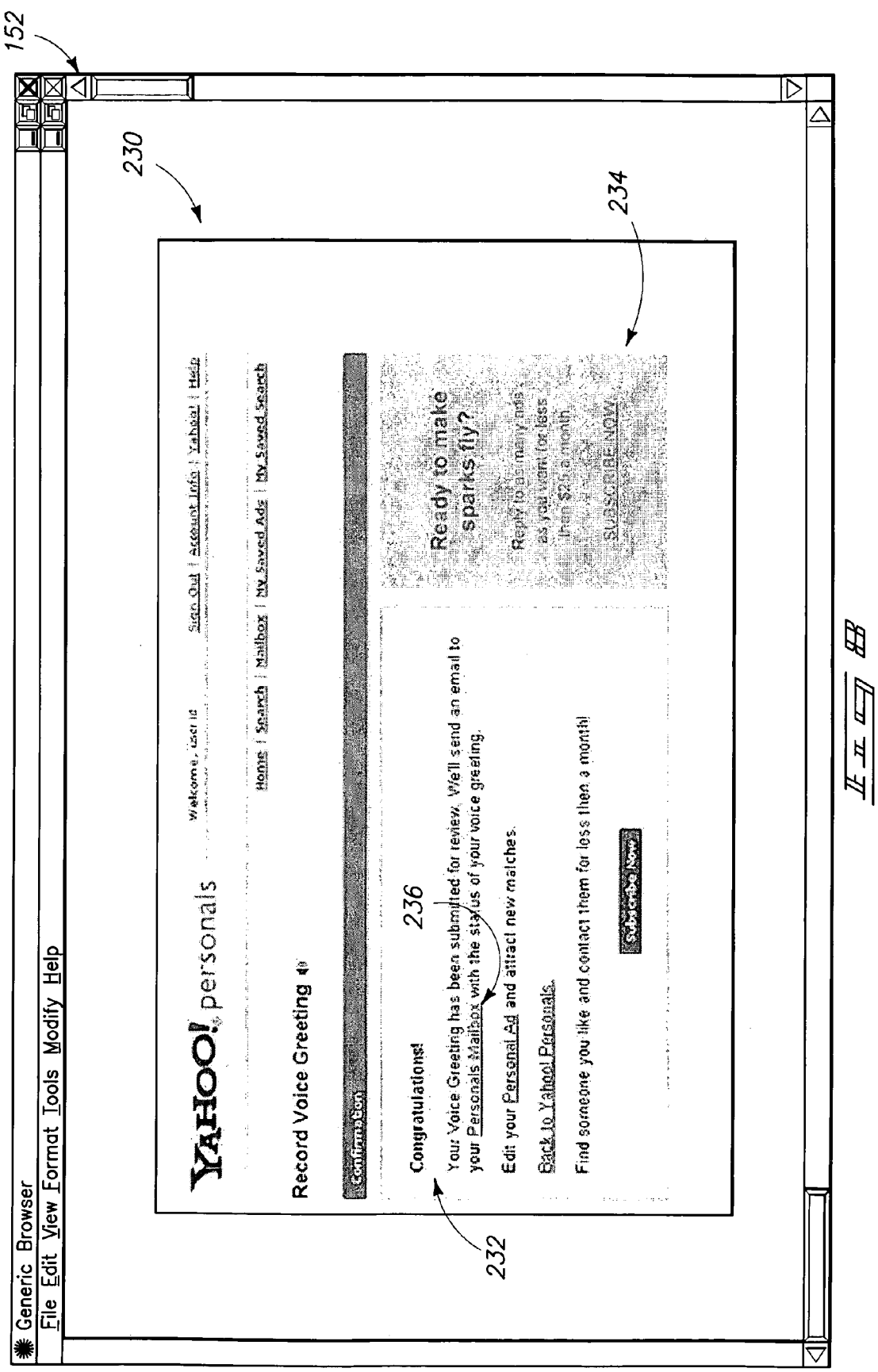
FIG. 8 is a screen display of a "Confirmation" page presented to a user to confirm proper submission of a voice greeting to a service provider.

FIG. 8 illustrates a fifth step in posting a voice greeting wherein a "Confirmation" page 230 is presented to a user for confirming that a voice greeting has been properly submitted to the service provider for review and acceptance or rejection. After a user has properly recorded a voice greeting and completed the telephone call, the user clicks "Done" button 228 (see FIGS. 5–7) on the presented status page. Such selection navigates the user to the "Confirmation" screen depicted by page 230 of FIG. 8. An e-mail is then sent to the user's Personals e-mail mailbox, confirming the user's submission of their voice greeting to the service provider's website.

As shown in FIG. 8, page 230 includes a "Congratulations!" instruction set 232 that congratulates the user for submitting a voice greeting for review by the service provider. A "SUBSCRIBE NOW" text link 234 enables a user to subscribe to a service that allows the user to reply to advertisements that have been reviewed on the service provider's website. A "Personals Mailbox" text link 236 enables a user to confirm the personals mailbox e-mail address to which an e-mail is sent to indicate the status of the user's voice greeting which has been submitted for review and approval.

Figure 9:
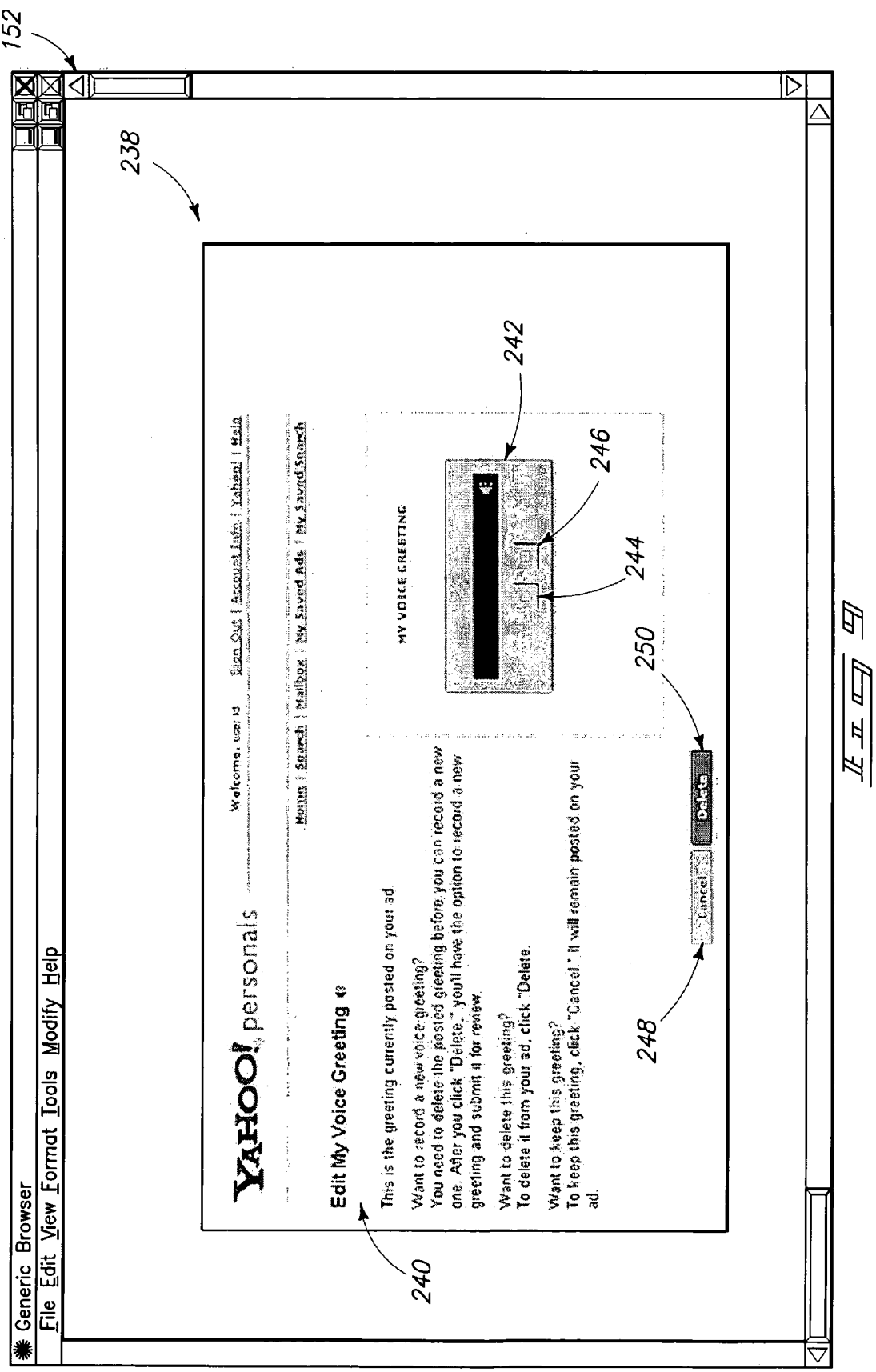
FIG. 9 is a screen display of a "Preview Greeting with Option to Delete" page that enables preview of a greeting to edit, delete, or play the voice greeting appended to a personal advertisement.

FIG. 9 illustrates a "Preview Greeting with Option to Delete" page 238 which initiates a procedure for editing and deleting a voice greeting from a personal advertisement. In order for a user to edit a posted voice greeting that is appended to a personal advertisement, the user signs in to the personals service provider's website. The user is provided with a personals home page (analogous to the page shown in FIG. 19, but for a voice greeting) on which a link is provided to edit their personal advertisement. When the user clicks on the "Edit" link, the user is taken to an "Edit Advertisement" page.

From the edit home page screen, a user may click the "Edit Voice" link provided above photographs of the user, which are provided on the page. From there, the user is informed of a process for recording a new greeting, or just deleting the existing greeting. In order to record a new greeting, the user is required to delete the existing greeting. A user can only have one voice greeting present on their advertisement, according to one implementation.

As shown in FIG. 9, screen 238 includes "Edit My Voice Greeting" instruction set 240. Instruction set 240 identifies a currently posted voice greeting along with instructions for recording a new greeting, deleting the present greeting, and procedures for keeping the greeting. An audio player 242 is provided for playing the existing voice greeting. Audio player 242 includes a "Start" button 244 and a "Stop" button 246 configured to enable initiation and play of the voice greeting, as well as stopping play of the voice greeting. A "Cancel" button 248 enables a user to cancel the preview. A "Delete" button 250 enables a user to delete their voice greeting. More particularly, selection of button 250 takes a user to a confirmation screen identified in FIG. 10 which asks the user if they really want to delete their voice greeting. If the user then chooses to delete the voice greeting, the voice greeting will be removed from the system and the user will be returned to the edit advertisement previous screen presented in FIG. 9. From the screen shown in FIG. 9, the user can opt to click an "Add Voice" link (not shown) to go through the process of creating a new greeting.

Figure 10:
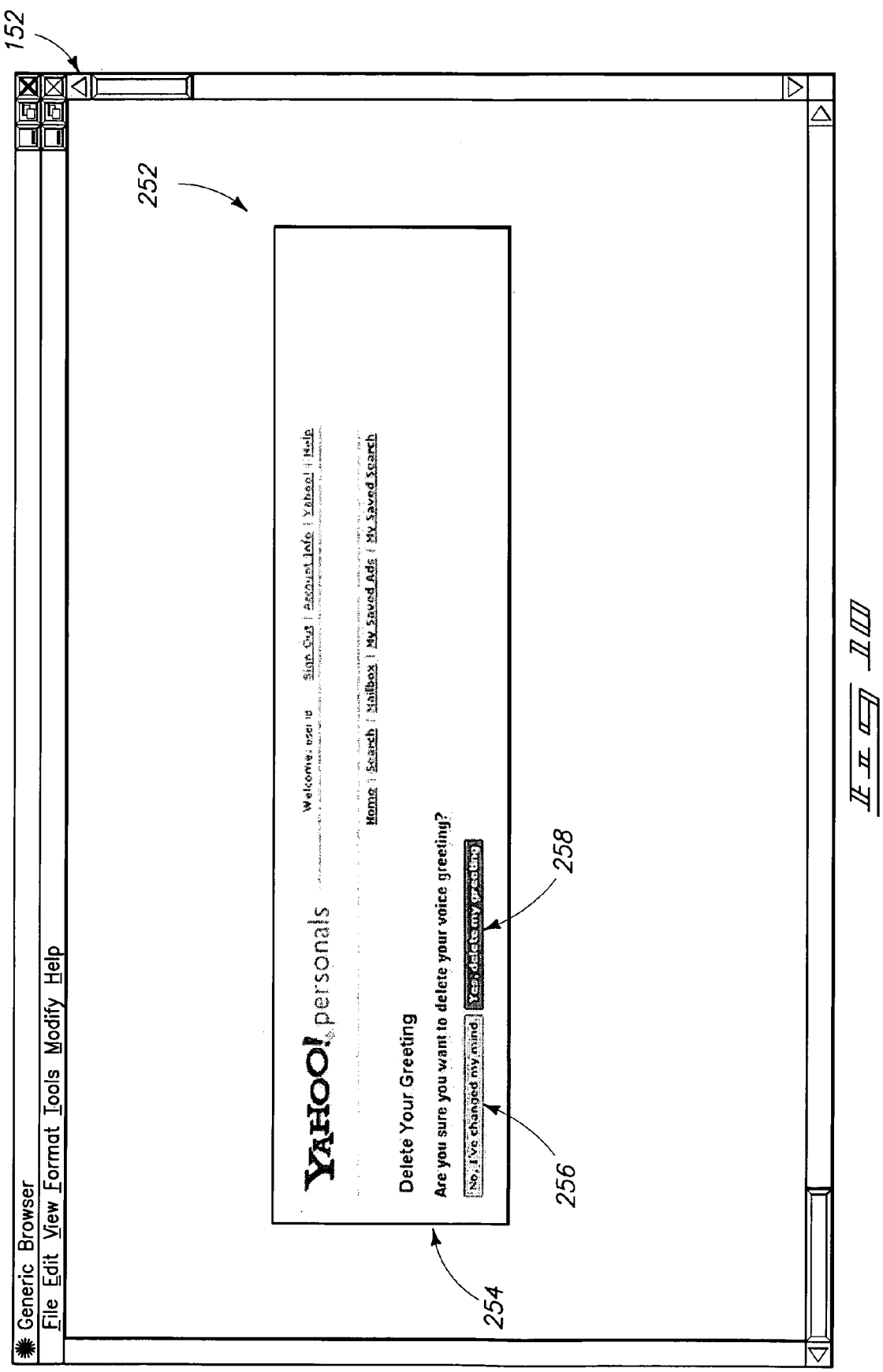
FIG. 10 is a screen display of a "Delete Confirmation" page that confirms deletion of a voice greeting.

FIG. 10 illustrates a "Confirmation" page 252 for deleting a voice greeting. Page 252 includes a "Delete Your Greeting" instruction set 254 that asks a user whether they are sure they want to delete their voice greeting. If the user decides that they don't want to delete their voice greeting, the user selects a "No" button 256. If the user is sure that they want to delete their voice greeting, the user selects a "Yes" button 258.

Figure 11:
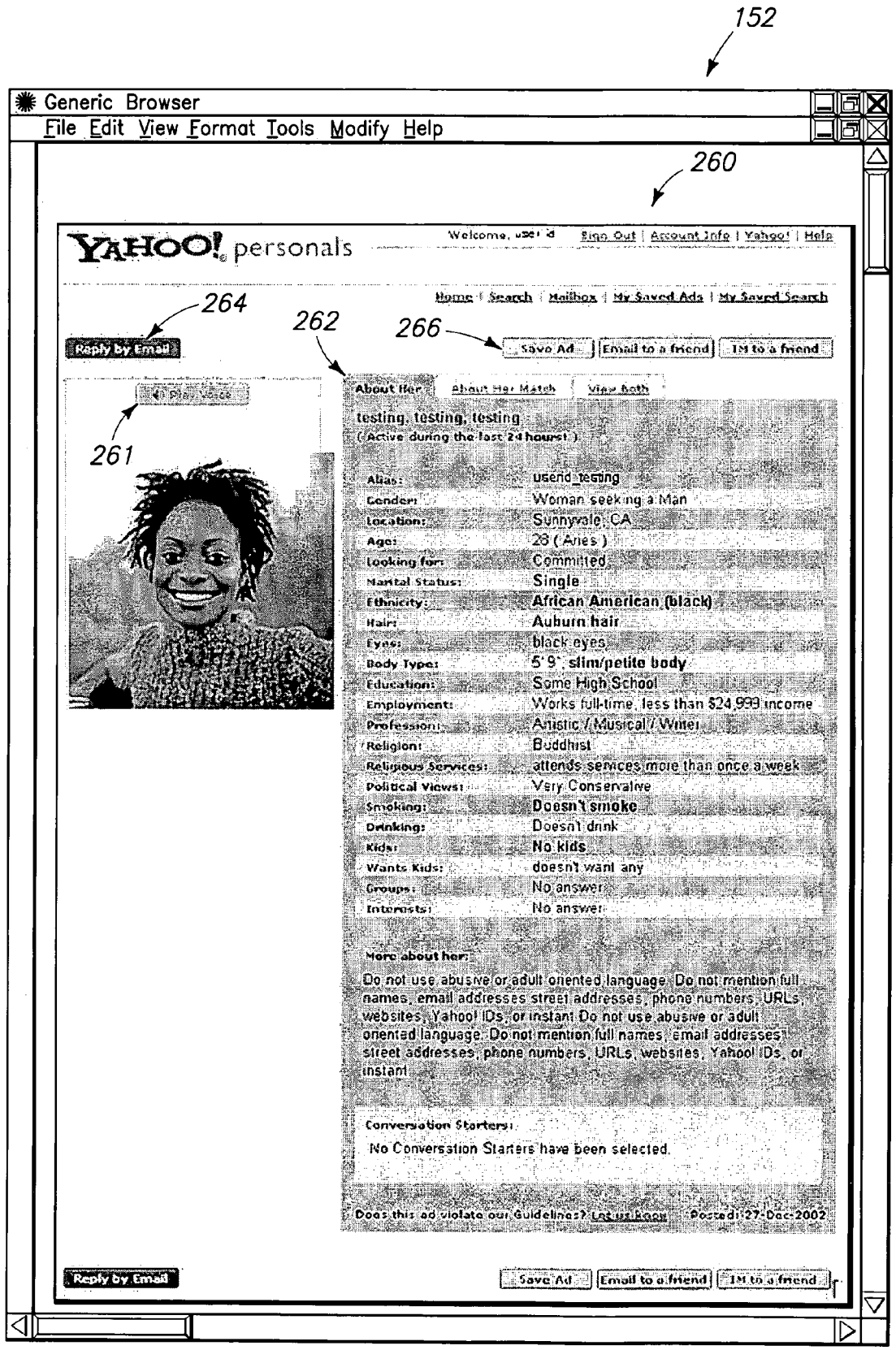
FIG. 11 is a screen display of a "Play Voice" page illustrating a personal advertisement with an appended voice greeting.

Upon successfully recording a voice greeting, a user who has posted a voice greeting to their personal advertisement can review the voice greeting by navigating to their personal advertisement, as shown in FIG. 11.

FIG. 11 illustrates a "Personals" page 260 for a user's personal advertisement which is accessible via a client over the Internet. Any user of the Internet who accesses the service provider's website can access "Personals" page 260 to review personal information about the user in order to assess the suitability of a potential mate, spouse, friend, or significant other. As shown in FIG. 11, page 260 includes a "Play Voice" icon button 261 which enables a user to play a prerecorded and approved voice greeting for the user who has posted such voice greeting on their personal advertisement. Accordingly, when a user has successfully posted a recorded voice greeting on their personal advertisement, the "Play Voice" icon button 261 appears on the user's personal advertisement detail page, as depicted in FIG. 11. Additionally, a smaller advertisement listing is also made available in a "Search Results" page (not shown) presented to third-party users who are searching the textual information of multiple personal advertisements to identify criteria that present a potentially suitable match between themselves and the posted users' personal advertisements.

A user can play the voice greeting from their search results by clicking on a voice icon that is provided under a photograph in the search results (not shown). This feature will open the detail view for the advertisement, as shown in FIG. 11, and begin playing the voice greeting. A user can also play the voice greeting from the advertisement detail using the "Play Voice" icon button 261 that is provided above a photograph (optional) in page 260 of FIG. 11.

Once a user has played a voice greeting, the user can return to the main photograph view page by clicking on the "Stop" button 246 which closes the link, as shown in FIG. 9. Upon closing this link, the page will refresh back to the main photograph view page (not shown).

Personals page 260 of FIG. 11 provides personals text data 262 under specific searchable categories for identifying characteristics of a user who has posted personal information on their personals advertisement. The text data 262 complements the voice greeting provided by selecting button 261. Such text information is searchable by third parties who are trying to identify a personal match between themselves and the individual who has posted the personal advertisement. Accordingly, text data 262 is viewable by third parties at clients distributed about the Internet via the service provider's website. A "Reply by E-mail" button 264 enables a third-party user to reply to the user whose personal information is displayed within page 260. A "Save Ad" button 266 enables a third-party viewer to save this advertisement into a separate memory location or folder for later re-review by the third-party user and further scrutinizing of the text data and personal information for the user who has posted the personal advertisement in order to further assess potential compatibility between the parties.

It is understood that a service provider's website can generate several types of errors which are presented to a user while recording a voice greeting. In one case, an area code or telephone number may not be supported by the service provider's system, in which case an error message is recycled to the user stating such problem and requiring the user to try a different telephone number. In another case, word verification is incorrect and an error message is recycled to the user stating such problem and requiring the user to try again with a new word verification procedure. In even another case, the identified telephone number may generate a busy signal, in which case the "Call Status" page will recycle to the user with an indication that they are attempting to call the user, but that the user must hang up their telephone or disconnect their modem in order to receive a call from the service provider. In even another case, a user is required to first post an advertisement before generating and attaching a voice greeting, and the system can redirect the user to a page informing them that they need to post an advertisement before recording a voice greeting. In even another case, a recording may be unsuccessful if there is a technical problem recording the voice greeting. In this case, the user will receive a "Recording Unsuccessful" page that informs them their greeting was not recorded. Finally, the user may receive a "Recording Cancelled" notice if the user clicks a "Cancel" button at any point in the process, and the user will be taken to a "Recording Cancelled" page that asks them if they want to cancel the recording process.

Figure 12:
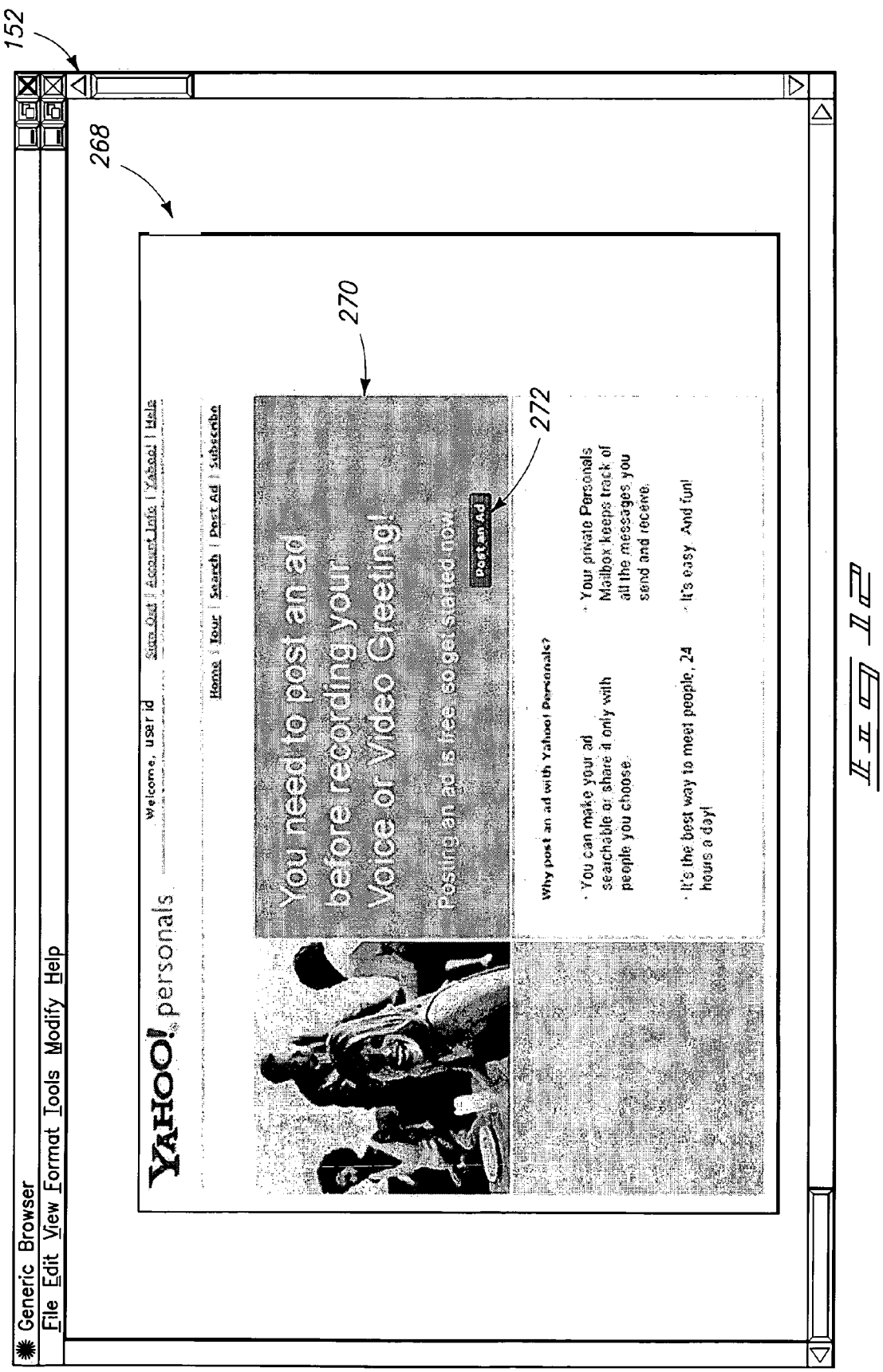
FIG. 12 is a screen display of an "Error" page that informs a user that a personal advertisement needs to be posted before recording a voice or video greeting.

FIG. 12 illustrates an "Error" page 268 that is generated when a user has not posted a personal advertisement before recording their voice (or video) greeting. A "Post an Ad" banner 270 is presented to a user on page 268. Banner 270 includes a "Post an Ad" button 272 that enables a user to navigate back to post an advertisement by sending the user to a page that enables the user to generate a personal advertisement.

Figure 13:
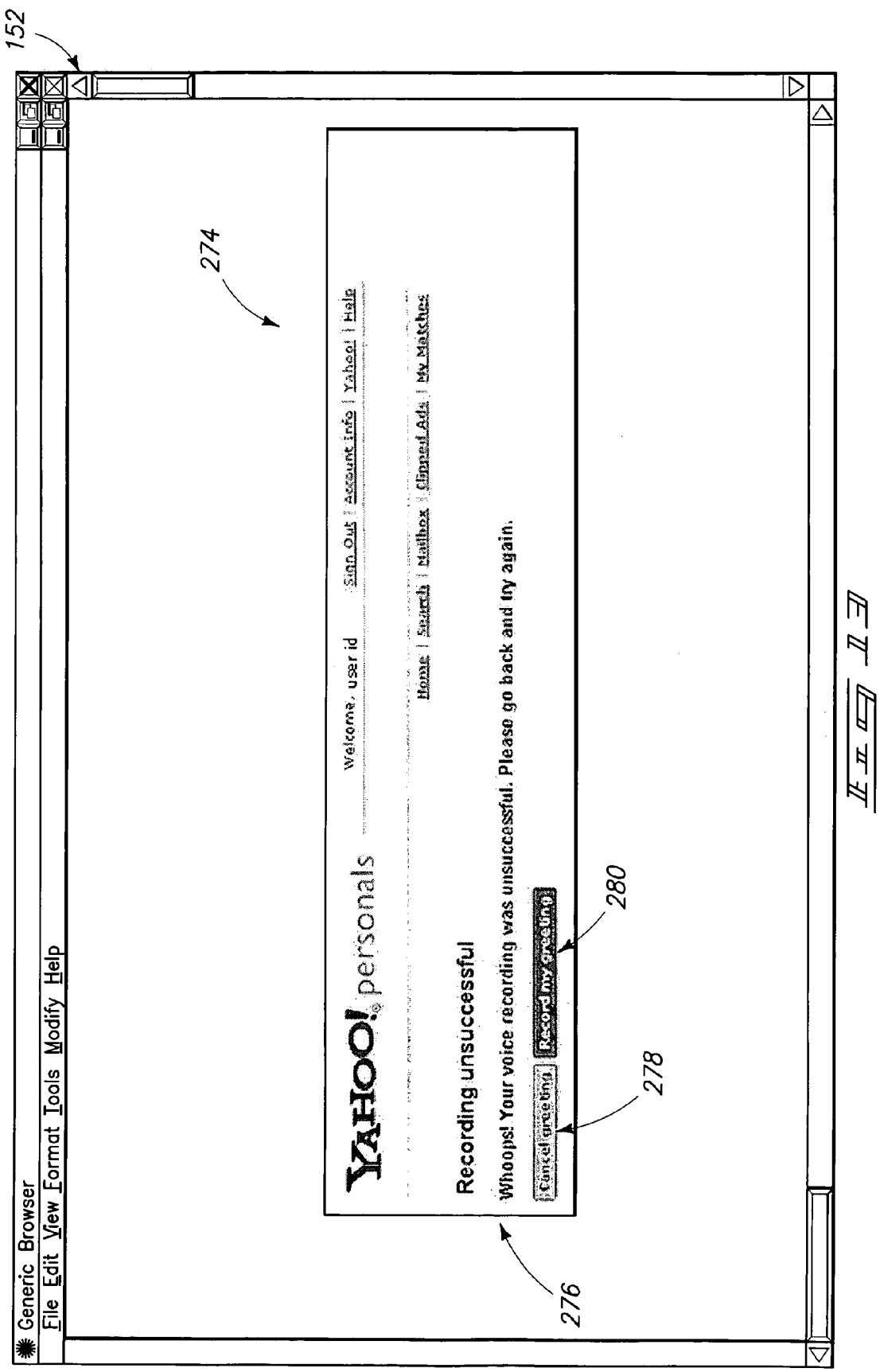
FIG. 13 illustrates a screen display of a "Recording Unsuccessful" page that informs a user that their voice recording was unsuccessful.

FIG. 13 provides a "Recording Unsuccessful" page 274 that includes a "Recording Unsuccessful" instruction set 276. Instruction set 276 tells a user that their voice recording was unsuccessful and that the user needs to go back and try to re-record the voice recording. A "Cancel Greeting" button 278 enables a user to cancel the greeting. A "Record My Greeting" button 280 enables a user to attempt to re-record their voice recording.

Figure 14:
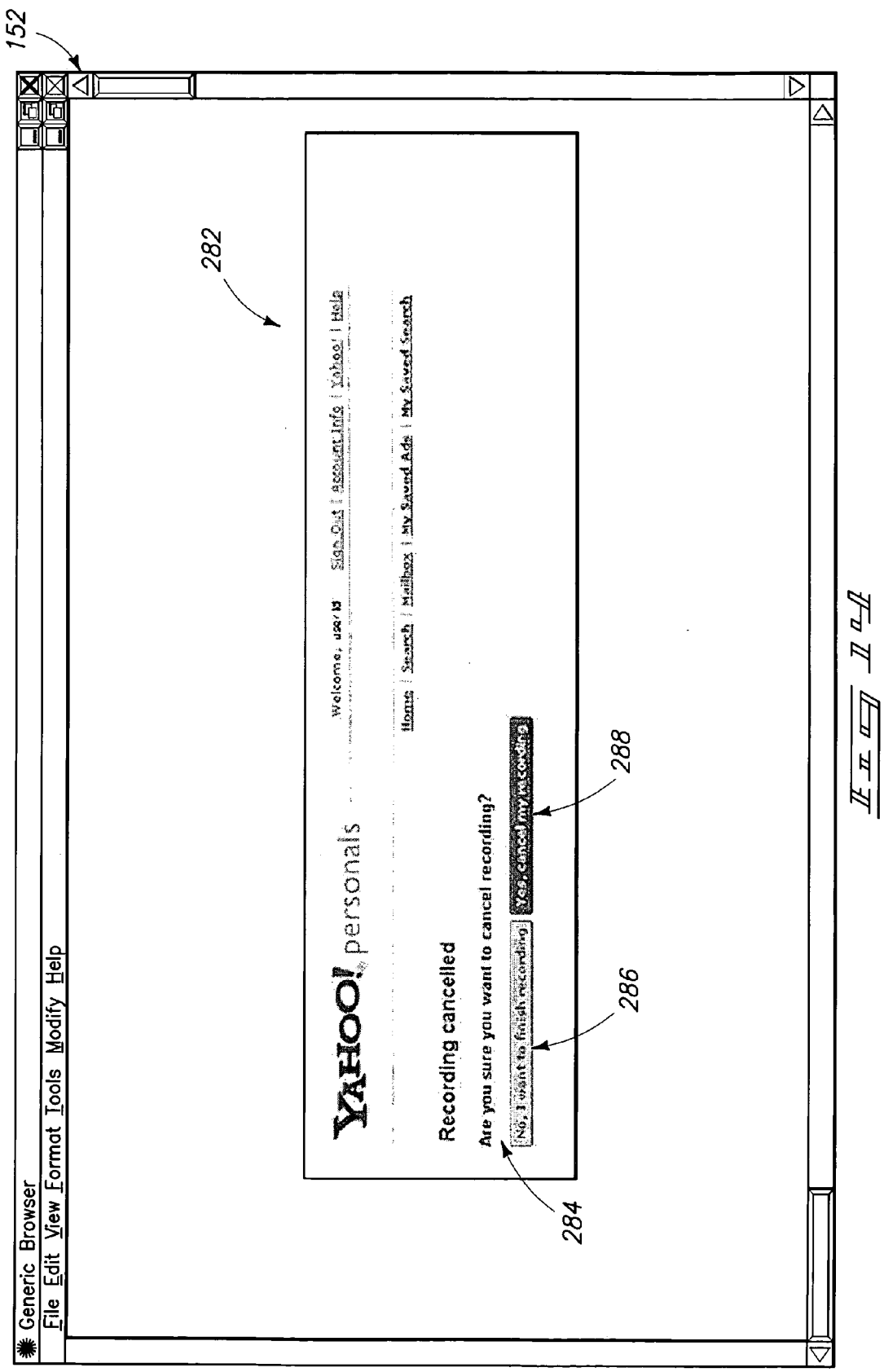
FIG. 14 illustrates a screen display of a "Recording Cancelled" page that confirms whether a user wants to cancel their voice recording.

FIG. 14 illustrates a "Recording Cancelled" page 282 which includes a "Recording Cancelled" instruction set 284 that asks the user whether they want to confirm their desire to cancel their voice recording. If the user is not sure, the user selects a "No" button 286 which allows them to finish the recording. If the user is sure they want to cancel the recording, the user selects a "Yes" button 288 which cancels the user's recording.

Video Greeting Configuration and Implementation

Figure 15:
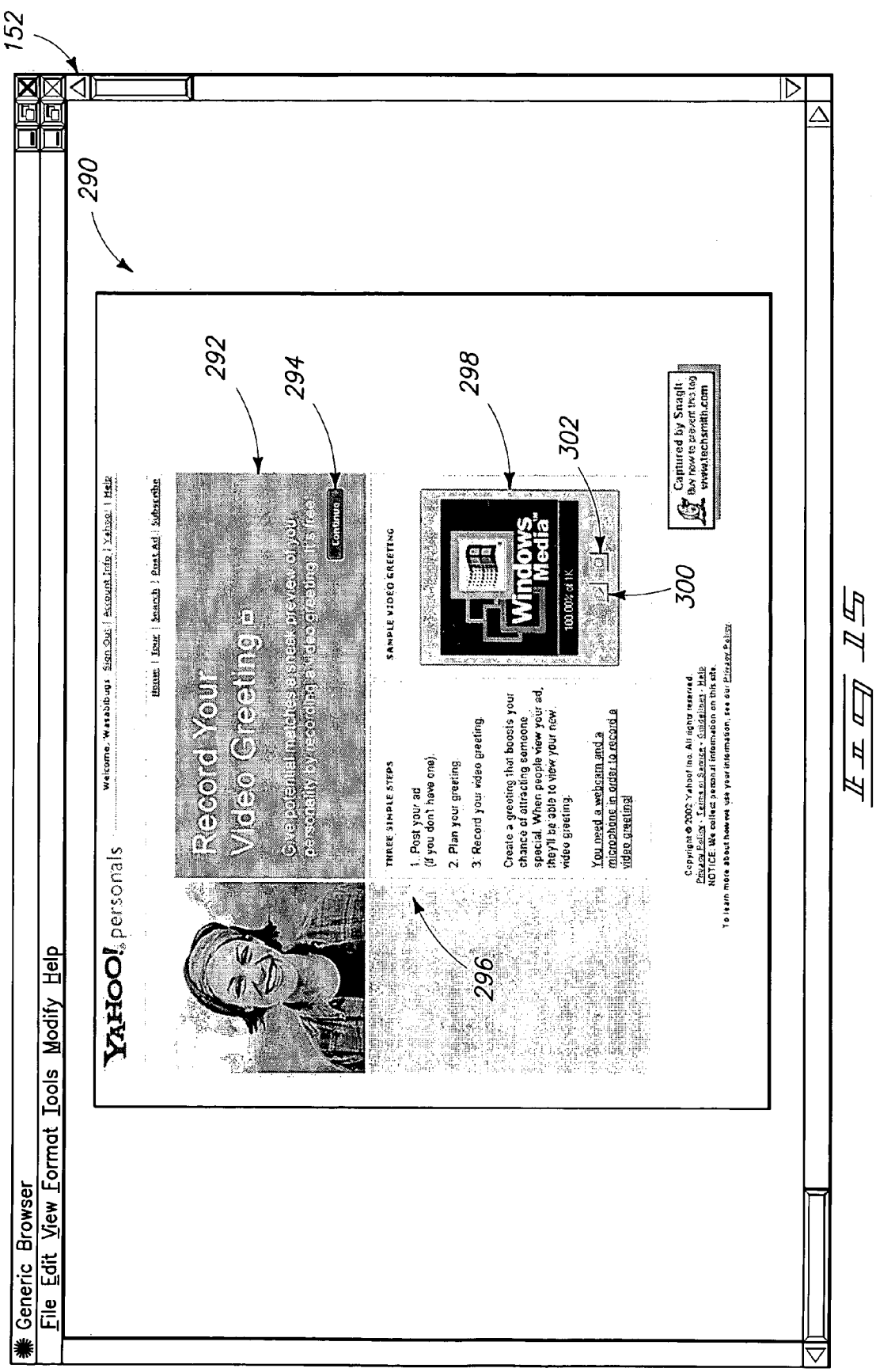
FIG. 15 illustrates a screen display of a "Video Greeting Splash" page for initiating preparation and recording of a video greeting by a user.

FIGS. 15–22 illustrate a technique for generating a video recording which is appended to a personal advertisement that is made available on the Internet by way of a service provider's website. FIGS. 23–25 illustrate error messages and indicators that identify when a recording is unsuccessful or when a user desires to cancel the recording. More particularly, FIG. 15 illustrates a video greeting splash page 290 in which a "Video Greeting" banner 292 is presented to a user. Banner 292 includes a "Continue" button 294 that directs a user to the screen display of FIG. 16 to initiate the process for recording a video greeting. Page 290 includes a three-step instruction set 296 that identifies three simple steps for posting an advertisement, planning a greeting, and recording a video greeting. Page 290 also includes a video player 298 which includes a "Start" button 300 and a "Stop"

button 302. Selection of "Start" button 300 initiates play of the video greeting (along with any accompanying audio message). Selection of "Stop" button 302 stops play of the video greeting.

Video greetings provide a new technique for a user to enhance their personal advertisement presented on a personals service provider's website. The video greetings allow a user to record a finite period video greeting, such as a 30-second video recording, that is then attached to the user's personal advertisement. The video player is then embedded onto a web page associated with the user that allows third parties to view the greeting directly in the personal advertisement of the user. As was the case with voice greetings, the video greetings are submitted for review and approval by personnel at the service provider's website. Accordingly, the suitability of the material being presented can be reviewed and either approved or rejected for posting onto the website.

According to one implementation, only users having personal advertisements can record a video greeting. However, it is not necessary that the user be a subscriber of the service provider in order to record a video greeting.

A video greeting is understood to be a component that a user having a personal advertisement can add to their personal advertisement. A video greeting allows the user to record a finite-duration (e.g., 30-second) video clip using their own personal webcam and microphone which are preferably associated with the user's home computer (or client), which is connected to the Internet.

According to one implementation, users post a video greeting if they have already posted a personal advertisement to the service provider's website. However, the user will not be able to post a video greeting until the personal advertisement has been enabled and is live on the service provider's website. Video greetings are submitted for review to personnel at the service provider in the same way that voice greetings are submitted, as previously discussed. Users are then subsequently notified by e-mail after submitting their video greeting, and further receive an e-mail once a video greeting has been either accepted or rejected. For the case of a "User Management Tool" (UMT), video greetings are reviewed in a separate queue.

Figure 16:
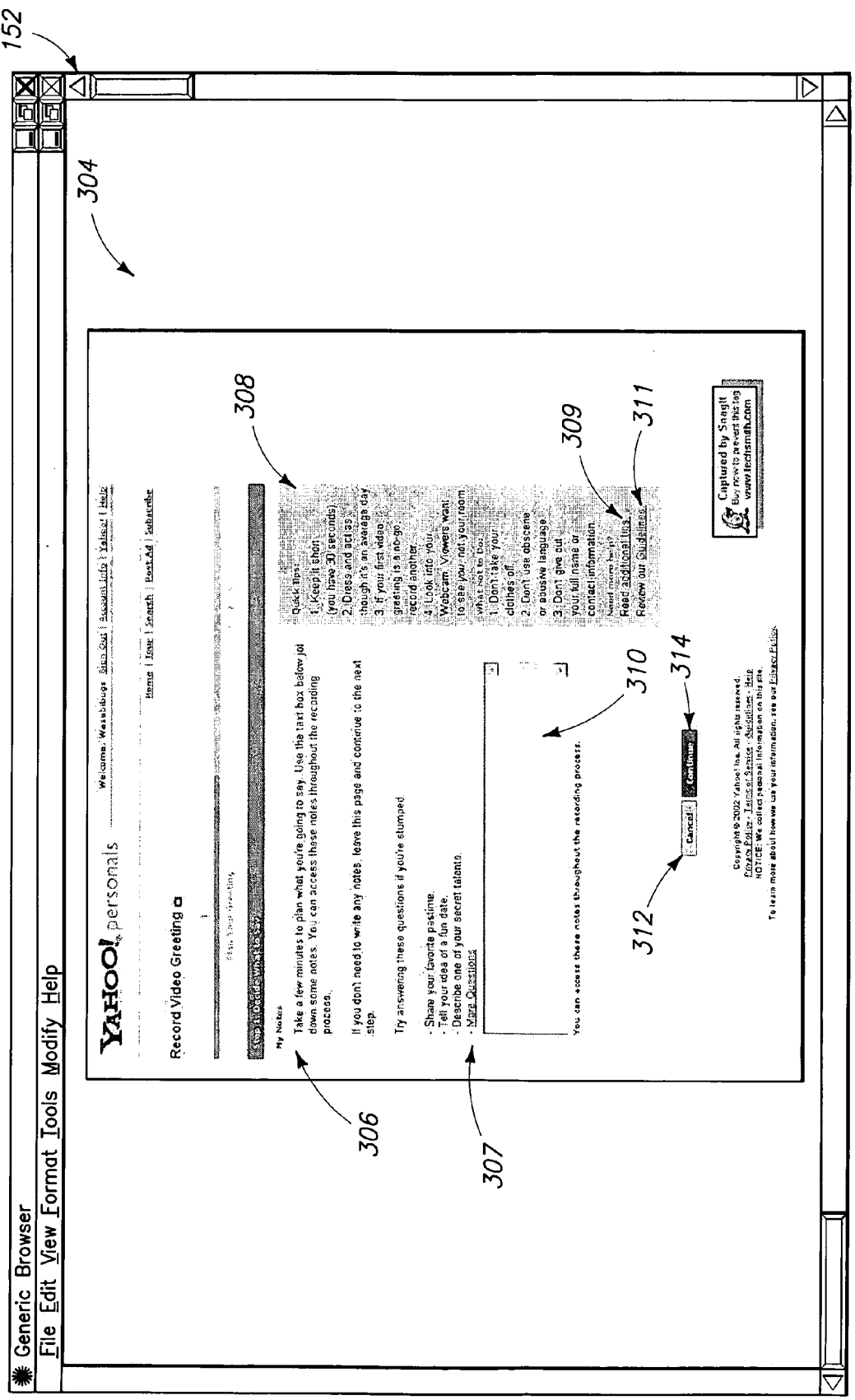
FIG. 16 illustrates a screen display of a "Plan What to Say" page for recording notes that assist a user in generating a video greeting.

FIG. 16 illustrates a first step for posting a video greeting comprising a "Plan What to Say" page 304. Page 304 includes a "My Notes" instruction set 306 that gives instructions for taking notes that assist a user in generating a video greeting. Additionally, page 304 includes a "Quick Tips" instruction set 308 that gives quick tips for recording a video greeting. A "My Notes" entry box 310 enables a user to enter personal notes that are used when recording a video greeting by way of an input device such as a keyboard and/or a mouse. Instruction sets 306, 308 and box 310 are analogous to the features provided when recording a voice greeting, as previously discussed. A "Cancel" button 312 enables a user to cancel the video greeting recording process. A "Continue" button 314 enables a user to navigate on to the screen display of FIG. 17 for video submission.

As shown in FIG. 16, the first step involves a user navigating to the "Video Greeting Splash" page 304 which informs the user about the requirements for posting a video greeting, as well as the steps required for recording a video greeting.

According to one implementation, the following are required: A user is first required to have an advertisement posted on the personals service provider's website. However, a user will be allowed to record a video greeting if the user has an incomplete personal advertisement, but the video greeting will not be posted until the personal advertisement has been posted on the service provider's website. Secondly, the user is required to have a webcam and a microphone. Users cannot upload previously recorded greetings, according to one implementation. However, other implementations may enable a user to upload previously recorded greetings.

Figure 17:
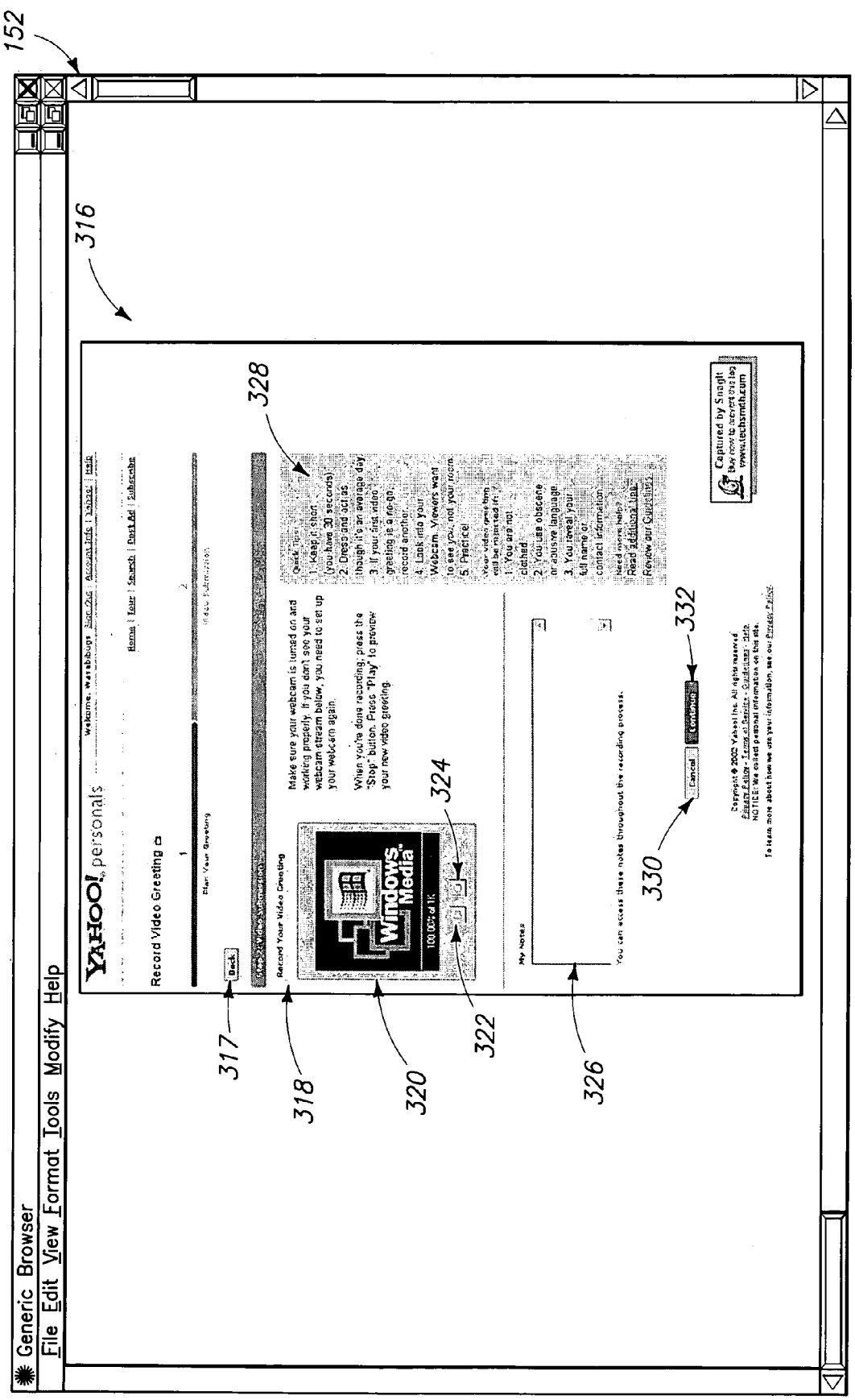
FIG. 17 illustrates a screen display of a "Record and Submit Video Greeting" page including a video player/recorder and an instruction set.

According to FIG. 17, a second step in planning a video greeting is illustrated by a "Record and Submit Video Greeting" page 316. Page 316 includes a "Record Your Video Greeting" instruction set 318 as well as a video player/recorder 320 (which includes an associated audio player and recorder). A "Back" button 317 enables a user to navigate back to the screen display of FIG. 16. Video player/recorder 320 includes a "Start" button 322 for starting play of the video greeting, and a "Stop" button 324 for stopping play of the video greeting. Once a video stream is made available, the video player becomes a recorder, and a record button is further presented. One suitable video player/recorder 320 is provided by Microsoft Corporation, of Redmond, Wash., in the form of Windows Media Player™ player 9 Series. However, other similar video players/recorders containing video and audio components can also be utilized.

A "My Notes" entry box 326 displays personal notes that were previously entered into box 310 on FIG. 16. If no such notes were entered, none are shown in box 326 of FIG. 17. A "Quick Tips" instruction set 328 provides a list of quick tips and reasons for rejecting a video greeting. A "Cancel" button 330 enables a user to cancel the recording and submission of a video greeting. Selection of a "Continue" button 332 enables a user to navigate forward to the screen display depicted in FIG. 18.

As shown in FIG. 17, a user is taken to the second step of the video recording process in order to plan their video greeting. By using page 304 (of FIG. 16), a user is given the opportunity to type in personal notes (into box 310) about what they want to say in their video greeting. The notes are then displayed in box 326 of FIG. 17. However, as previously discussed and as discussed in regard to the voice recording, such a feature is optional. The user does not have to use such feature, and it is not required that notes be filled out before a user goes to the next step depicted in FIG. 17.

If a user chooses to put notes into box 310 of FIG. 16, the notes will show up in box 326 of FIG. 17 where a user records their video greeting. If a user needs assistance or inspiration in writing up a text outline for a video greeting, the user can click on a "More Questions" link 307 (see FIG. 16), which will give them a pop-up window (not shown) providing more questions to help the user decide what to say in their video greeting.

If a user needs additional information about the service provider's guidelines, the user can click on a "Review Our Guidelines" text link 311 provided on the bottom of the right column of FIG. 16. If a user needs more tips about how to record a video greeting, the user can click on an "Additional Tips" text link 309, also provided on the bottom of the right column.

Page 316 of FIG. 17 provides for a video submission where a user records and submits their video greeting. If the user previously entered personal notes in box 310 (of FIG. 16), such personal notes will show in box 326 of FIG. 17. When the user reaches page 316 of FIG. 17, the user should automatically see their webcam stream and the video player/recorder 320 on page 316 if their webcam is plugged into their computer and is turned on.

In order to record a video greeting, a "Record" button 322 is selected on video player/recorder 320. To stop the recording, "Stop" button 324 is selected. According to one construction, users have 30 seconds to record their video greeting. A timer is provided in the corner of video player/recorder 320 which will tell a user how much time has been recorded by the video recorder.

In order to review a video greeting that has been recorded, button 322 becomes a start (or play) button on video player/recorder 320, after a video greeting has been recorded. If the user does not like their video greeting after reviewing the video greeting, the user can re-record the video greeting as many times as they like before submitting the video greeting to the service provider for review. In order to re-record a video greeting, the user merely presses the "Record" button and the old greeting is deleted during the re-recording process. Optionally, separate record and start buttons are provided on video player 320.

Figure 18:
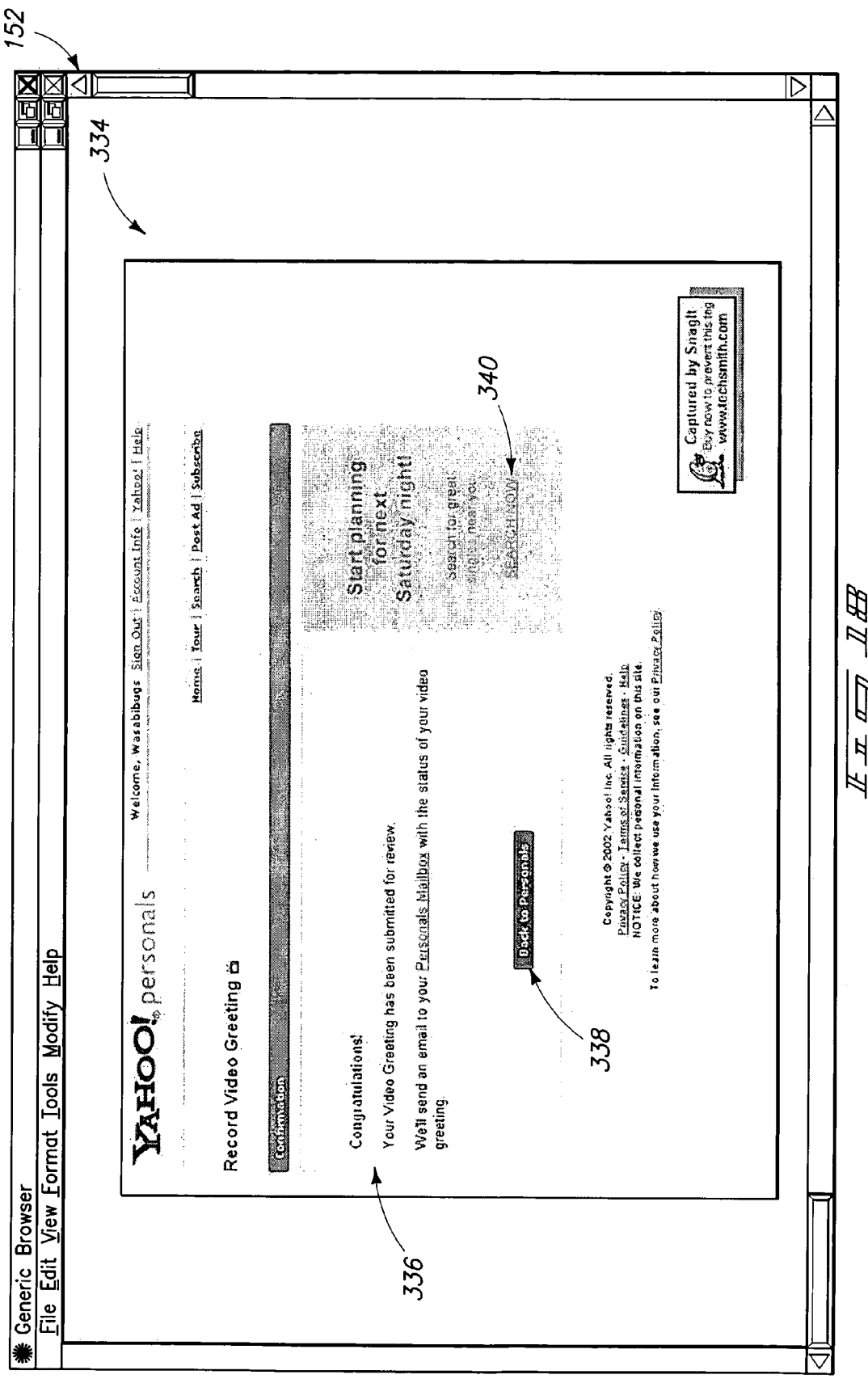
FIG. 18 illustrates a screen display of a "Submission Confirmation" page that tells a user when their video greeting has been submitted for review by a service provider.

FIG. 18 illustrates a third step in the process comprising submission confirmation. More particularly, a submission confirmation page 334 is provided including a "Congratulations!" instruction set 336 which tells a user that their video greeting has been submitted to the service provider for review, potential approval, and posting on their website. A "Back to Personals" button 338 enables a user to return to a personals page such as page 342 of FIG. 19. After a user has recorded a satisfactory video greeting and they are satisfied with their video greeting, the user merely clicks "Continue" button 332 on the bottom of FIG. 17 in order to submit the video greeting for review by a customer care person (who reviews and approves content) at the service provider. The user will then receive a confirmation screen as depicted in FIG. 18, informing the user that the video greeting was submitted. An e-mail will also be sent to the user's personals e-mail mailbox, confirming submission of their video greeting for review, approval, and hopefully posting on the service provider's website. A "SEARCH NOW" text link 340 enables a user to begin searching third-party personal advertisements in order to identify a potential match between potentially compatible individuals.

In order to edit or delete a video greeting from a personal advertisement, a user may sign in to the personals service provider's website. A personals home page is provided for the user which includes a link to "Edit My Ad". When the user clicks on such link, the user is taken to an edit advertisement page. Users can decide between two options. First, the user can edit a video greeting, by deleting a current version and recording a new version. Secondly, the user can delete the video greeting by permanently removing the video greeting from the user's personal advertisement.

In order to edit a video greeting, the user clicks on an "Edit My Greeting" link. This link will take a user to a screen where they are asked to delete the current greeting, identified by the screen display of FIG. 21. After deleting the greeting, the user is taken to a screen confirming the deletion of their greeting (not shown). The user can then choose to record a new greeting, or return to edit their personal advertisement. In order to delete a video greeting, the user clicks on an "Edit My Greeting" link. This action takes the user to a screen where they are asked to delete their current greeting. After deleting the greeting, the user is taken to a screen confirming the deletion of their greeting. The user can then choose to record a new greeting, or can return to edit their personal advertisement.

FIG. 19 illustrates a personals preview page 342 that includes personals text data 344 for the user who is preparing and posting a personal advertisement. A "Preview and Post" instruction set 346 informs a user that their advertisement has not been posted, but that a preview of the advertisement is being presented to illustrate how the personal advertisement will appear when posted on the service provider's website. Instruction set 346 also indicates to a user how they can start the approval process and how they can implement changes to the personal advertisement. A "Back" button 348 enables the user to navigate back to the screen display depicted in FIG. 17. A "Post Ad" button 350 (as well as button 358) enables a user to submit the advertisement for approval and posting. A "Save and Finish Later" button 352 (as well as button 360) enables a user to save the personal advertisement being previewed, and to later finish review and finalization of the personal advertisement.

Page 342 also includes an "Edit Voice" text link 354 that enables a user to edit the voice component of their video greeting. Additionally, an "Edit Video" text link 356 enables a user to edit the video component of their video greeting.

FIG. 20 illustrates an "Edit My Video Greeting" page 362 in which an "Edit Video Greeting" instruction set 364 is provided along with an editable video player 366. A "Start" button 368 on "Video Player" 366 enables a user to start playing of the video greeting to review the video greeting. A "Stop" button 370 enables a user to stop playing of the video greeting during the previewing process. Instruction set 364 notifies a user that the provided video greeting will be posted on the user's personal advertisement and queries the user whether they want to record a new video greeting, want to delete the present video greeting, or want to keep the present video greeting. A "Cancel" button 372 enables a user to cancel the previewing of the present video greeting. A "Delete" button 374 enables a user to delete the present video greeting before the user is enabled with the ability to record a new video greeting. After selecting the "Delete" button 374, the user has the option to record a new greeting and submit the new video greeting for review by personnel at the service provider's website. By selecting the "Cancel" button 372, the user keeps the existing recorded video greeting and such greeting remains posted on the user's personal advertisement.

Selection of the "Delete" button 374 in FIG. 20 navigates the user to a "Delete Your Greeting" confirmation page 376 in the screen display of FIG. 21. More particularly, page 376 of FIG. 21 includes a "Delete Your Greeting" instruction set 378 that queries the user whether they want to delete their video greeting. If a user does not want to delete their video greeting, the user selects a "No" button 380. If a user wants to delete their video greeting, the user selects a "Yes" button 382, which deletes the video greeting.

In order to play a video greeting from a user's personal advertisement, a "Play Video" icon will appear on the user's personal advertisement detail page as made publicly available on the service provider's website, as illustrated in the screen display of FIG. 22. In order to play the video greeting, a user merely clicks on an associated icon (390, 396, or 398) within the screen display of FIG. 22. Such functionality is only provided if the user has posted a video greeting to their personal advertisement and such greeting has been reviewed and approved by the personnel at the service provider, after which the approved video greeting is posted onto the service provider's website under the user's personal advertisement detail page.

In order to return to a photograph view page, once a user has played a video greeting they can return to the main "Photo View" page by clicking a "Close" link that is provided on the video player as discussed below with reference to FIG. 22. The page then refreshes back to a more traditional photographic view of the user. Accordingly, instead of showing a video player, a photograph is illustrated of the user on their personal advertisement detail page.

FIG. 22 illustrates a play video personal advertisement page 384 in which a video player 388 is provided in substitution for a more traditional photograph. Video player 388 includes a "Play" button 390 and a "Stop" button 392 which enable playing and stopping of the associated video components including voice and/or video. Video player 388 also includes a "Close" button that enables a user to close the video player which replaces the video player display with a previously selected photograph of the user associated with the personal advertisement.

Page 384 also includes "Personals Text Data" 386 that describe the user who is detailed in the personal advertisement. Such data 386 is presented by category, with the information being searchable by third-party users who want to identify a potential match using the personal advertisement. A "Reply by E-mail" button 394 enables a third-party reviewer of page 384 to reply to the user who is detailed within the personal page. A "Play Voice" button 396 enables a third-party viewer of page 384 to solely play an audio component of the video greeting within video player 388. A "Play Video" button 398 enables a third-party viewer to solely play a video component of the video greeting presented by video player 388. A "Save Ad" button 400 enables a user to save the personal advertisement that has been viewed by the third-party user into a personal memory location or folder for later further consideration and/or review in order to determine a potentially suitable match.

FIG. 23 illustrates a no posting error 402 which is displayed when a user has not previously posted a personal advertisement before recording their voice or video greeting. A voice or video greeting posting reminder banner 404 is illustrated to the user and includes a "Post an Ad" button 406 which redirects the user back to a page that enables them to generate a personal advertisement. A "Post an Advertisement" instruction set 408 details reasons why a user should post a personal advertisement with the service provider before recording a voice or video greeting.

If a user tries to record a video greeting but has not previously posted an advertisement, the user will be redirected to a page that informs them that they need to post an advertisement before recording a video greeting, as detailed in FIG. 23.

As shown in FIG. 24, if there is a technical problem recording a video greeting, a user will receive a "Recording Unsuccessful" page 410 which informs them that their video greeting was not recorded. "Recording Unsuccessful" page 410 includes a "Recording Unsuccessful" instruction set 412 that tells the user that their video recording was unsuccessful and that they need to go back and try to re-record the video greeting. A "Cancel Greeting" button 414 allows a user to cancel the greeting. A "Record My Greeting" button 416 enables a user to go back and attempt to record another video greeting.

Another video greeting error results is a user clicks "Cancel" at any point in the video greeting recording process. At that point, the user is taken to a "Recording Cancelled" page as shown in FIG. 25 by recording cancel page 418. Page 418 asks the user if they want to cancel the recording process.

As shown in FIG. 25, page 418 includes a "Recording Cancelled" instruction set 420 that asks the user if they really want to cancel their recording. If the user does not want to cancel the recording, the user selects a "No" button 422 that indicates that the user wants to finish their recording. If the user does want to cancel the recording, the user selects a "Yes" button 424 which cancels the user's video recording.

Pursuant to the previously-described implementations, it is understood that a user can submit prerecorded video and/or audio content for review and authorized attachment to their personal advertisement on a service provider's website. The personal advertisement is posted on a personal web page that is hosted by the service provider. In one case, a user can use their home video camera to record a video clip (which may also include an accompanying audio clip). In another case, a user can prerecord a voice greeting using an analog or digital voice recorder, such as a cassette recorder. Furthermore, as previously disclosed, a user can directly record video and/or audio interactively while using the screen display features of the service provider's server and website.

An additional further advantage is provided where a service provider uses content review personnel to review and approve personal greetings that have been prepared by a user and submitted to the service provider for review and approval. One technique for reviewing a personal greeting (such as a voice and/or video clip) comprises a designated administrative person at the service provider who views a video clip and/or listens to a voice clip of a personal greeting in order to determine whether there is any undesirable content. Examples of undesirable content might include vulgar statements, personally offensive statements, ethnically offensive statements, sexually explicit statements unsuitable for children, statements relating to illegal activities and threats, and visual presentations of a sexual or illegal nature. It is envisioned that other video and audio greetings may contain elements which are undesirable and which a service provider may deem inappropriate for posting on a user's personal web page that is hosted by the service provider. One technique entails personnel for the service provider being provided with a list of undesirable video and/or voice elements for which they are to search submitted personal greetings to determine whether any such undesirable content is present. In the event that such content is identified, the personnel will reject such personal greeting, and notify the user that their personal greeting submission has been rejected, and will not be approved for appending to their personal advertisement and posting on the service provider's website.

An even further advantage is provided by enabling a third-party user of a service provider's website to review many individuals' personal advertisements and to access personal advertisements that comprise multi-media content that includes one or more of a video component and an audio component. Accordingly, third-party users are provided with the ability to visually identify a special icon on a personal advertisement and to selectively enable and review the video and/or audio component of the personal advertisement to further enhance their ability to identify a potentially suitable match between themselves and the individual who is characterized in the personal advertisement. It is further understood that personal advertisements may include biographical information for the users to which the personal advertisement is directed. The appending of video greetings and voice greetings further enables a third-party user to better determine a potential match by providing richer personal information about the individual to whom the personal advertisement is directed. For example, the provision of a video player or an audio player which is embedded in a web page of a personal advertisement enables a third-party user to launch the video or audio clip to review dynamic information about the party described in the personal advertisement.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method for adding content to a personal advertisement over a network, comprising:
    providing to a client an application program interface that enables access to the personal advertisement, wherein at least a portion of content for the personal advertisement is associated with a particular user, and wherein the client is associated with the particular user;
    employing the application program interface, on the client, to select one of a plurality of communication links to submit additional content over the selected one of the plurality of communication links, for association with the personal advertisement to a service provider for approval, wherein the additional content includes at least one of video or audio;
    submitting the additional content over the selected one of the plurality of communication links;
    enabling at least one other client to access at least the additional content approved for association with the personal advertisement.

2. The method of claim 1, further comprising enabling editing of the additional content for the personal advertisement on the client.

3. The method of claim 1, wherein the plurality of communication links include at least one of a telephone communication link or a camera coupled to the client.

4. The method of claim 1, further comprising providing audio guidance for the submission of the audio for the additional content over a telephone communication link.

5. The method of claim 1, further comprising
    employing a provided telephone number to initiate a telephone communication link with the particular user; and
    providing audio guidance to the particular user for submitting at least a portion of the audio for the additional content.

6. The method of claim 1, wherein the audio content includes at least one of voice, music, or sound.

7. The method of claim 1, further comprising providing information to the particular user associated with the personal advertisement, wherein the information is directed to at least one of creating, editing, and playing the additional content.

8. The method of claim 1, further comprising displaying information for playing the additional content to the at least one other user.

9. The method of claim 1, further comprising embedding a player for the additional content in the personal advertisement, wherein the player is displayed to enable the playing back of the additional content.

10. The method of claim 1, further comprising employing the application program interface to record the additional content, wherein the application program interface provides at least one control for recording the additional content and at least one control for submitting the additional content for approval.

11. The method of claim 1, wherein at least a portion of the additional content is recorded separate from the application program interface that provides access to the personal advertisement.

12. The method of claim 1, wherein at least a portion of the additional content includes selectable content that is prerecorded.

13. The method of claim 1, further comprising providing a notification to the particular user that the submission of additional content is approved for access by the at least one other user.

14. The method of claim 1, wherein at least a portion of the actions of the claimed method are implemented by at least one of a client, server, host, or peer application.

15. An apparatus for adding content to a personal advertisement over a network, comprising:
    a memory for storing information;
    a processor for employing the information to enable actions, including:
        providing to a client an application program interface that enables access to the personal advertisement, wherein at least a portion of content for the personal advertisement is associated with a particular user, and wherein the client is associated with the particular user;
        employing the application program interface, on the client, to select one of a plurality of communication links to submit additional content over the selected one of the plurality of communication links, for association with the personal advertisement to a service provider for approval, wherein the additional content includes at least one of video or audio;
        submitting the additional content over the selected one of the plurality of communication links;
        enabling at least one other client to access at least the additional content approved for association with the personal advertisement.

16. The apparatus of claim 15, wherein the application program interface is enabled by a browser application, and wherein the at least one other user employs the browser application to access the additional information approved for association with the personal advertisement.

17. The apparatus of claim 15, wherein the apparatus is a mobile device.

18. The apparatus of claim 15, further comprising enabling submission of at least a portion of the video for the additional content by a camera coupled to the apparatus.

19. The apparatus of claim 15, further comprising enabling submission of at least a portion of the audio for the additional content by a microphone coupled to the apparatus or over a telephone communication link.

20. The apparatus of claim 15, wherein the application program interface is provided at a website associated with the service provider.

21. A processor readable storage medium that includes information for adding content to a personal advertisement over a network, comprising:
    a module for providing to a client an application program interface that enables access to the personal advertisement, wherein at least a portion of content for the personal advertisement is associated with a particular user, and wherein the client is associated with the particular user;
    a module for employing the application program interface, on the client, to select one of a plurality of communication links to submit additional content over the selected one of the plurality of communication links, for association with the personal advertisement to a service provider for approval, wherein the additional content includes at least one of video or audio;

a module for submitting the additional content over the selected one of the plurality of communication links;

a module for enabling at least one client to access at least the additional content approved for association with the personal advertisement.

\* \* \* \* \*